US008140892B2

(12) United States Patent
Calinoiu et al.

(10) Patent No.: US 8,140,892 B2
(45) Date of Patent: Mar. 20, 2012

(54) CONFIGURATION OF MEMORY MANAGEMENT TECHNIQUES SELECTIVELY USING MITIGATIONS TO REDUCE ERRORS

(75) Inventors: Silviu C. Calinoiu, Kirkland, WA (US); David Grant, Duvall, WA (US); Anthony J. Lorelli, Kirkland, WA (US); Pavan Kasturi, Redmond, WA (US); William Campbell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 12/238,645

(22) Filed: Sep. 26, 2008

(65) Prior Publication Data

US 2010/0083036 A1    Apr. 1, 2010

(51) Int. Cl.
*G06F 11/00* (2006.01)
(52) U.S. Cl. ........................................ 714/6.2; 714/6.32
(58) Field of Classification Search ................. 714/9
See application file for complete search history.

(56) References Cited

U.S. PATENT DOCUMENTS

| 6,938,245 | B1* | 8/2005 | Spertus et al. ............... 717/127 |
| 7,191,364 | B2 | 3/2007 | Hudson |
| 7,287,191 | B2* | 10/2007 | Gadangi et al. ................ 714/38 |
| 7,346,755 | B2* | 3/2008 | Pomaranski et al. ......... 711/202 |
| 7,350,045 | B2* | 3/2008 | Swafford et al. ............. 711/170 |
| 7,451,387 | B2* | 11/2008 | Koktan et al. ................. 714/805 |
| 2002/0066052 | A1* | 5/2002 | Olarig et al. ................... 714/42 |
| 2003/0066049 | A1* | 4/2003 | Atwood et al. ............... 717/101 |
| 2005/0060514 | A1* | 3/2005 | Pomaranski et al. ......... 711/202 |
| 2005/0144410 | A1* | 6/2005 | Swafford et al. ............. 711/170 |
| 2006/0143537 | A1* | 6/2006 | Grey ............................... 714/38 |
| 2006/0236158 | A1* | 10/2006 | Thayer ............................ 714/701 |
| 2007/0011575 | A1* | 1/2007 | Koktan et al. ................. 714/763 |
| 2008/0177614 | A1* | 7/2008 | An et al. ............................. 705/9 |
| 2008/0209278 | A1* | 8/2008 | Barsness et al. ................ 714/38 |
| 2008/0301501 | A1* | 12/2008 | Grant et al. ..................... 714/37 |

OTHER PUBLICATIONS

Dynamic Memory Solutions, "Dynamic Leak Check for Solaris, HP-UX and Linux "The World's Most Advanced Memory Leak Detection Tool"," http://www.dynamic-memory.com/dynamic_leak_check_html, retrieved Aug. 5, 2008.

Ho, E., "Windows 2000: A More Reliable OS Environment," PowerSolutions, p. 4-7, ftp://143.166.170.10/app/1q00w2ke.pdf; retrieved Aug. 5, 2008.

IBM, "HeapRoots," http://www.alphaworlcs.ibm.com/tech/heaproots; retrieved Aug. 5, 2008.

(Continued)

Primary Examiner — Scott Baderman
Assistant Examiner — Kamini Patel
(74) Attorney, Agent, or Firm — Wolf, Greenfield & Sacks, P.C.

(57) ABSTRACT

Techniques for performing memory management to mitigate memory errors. In accordance with the principles described herein, a memory management module may be implemented that acts in different modes of operation for each of one or more software modules that are instances of applications. In one mode of operation, memory operations may be performed in accordance with one or more mitigation actions, and in another mode of operation, the memory management module performs memory operations as requested, without performing mitigation actions. A memory management module may maintain a record in a data store associated with the memory management module that may be used to determine whether to enable the mitigations. In some implementations, records maintained by each of a plurality of computing devices may be aggregated at a central server and this aggregated information may be used to adjust the entries on each of the computing devices.

20 Claims, 19 Drawing Sheets

OTHER PUBLICATIONS

Microsoft, "Diehard: Probabilistic Memory Safety for Unsafe Programming Languages," http://research.microsoft.com/conferences/pldi06/presentations/diehard_pldi06.pdf; retrieved Aug. 26, 2008.

Microsoft, "Install Debugging Tools for Windows 32-bit Version," http://www.microsoft.com/whdc/devtools/debugging/installx86.mspx#a; retrieved Aug. 26, 2008.

Microsoft, "Microsoft Advanced Windows Debugging and Troubleshooting," http://blogs.msdn.com/ntdebugging/default.aspx; retrieved Aug. 5, 2008.

Microsoft, "The Structure of a Page Heap Block," http://msdn.microsoft.com/en-us/library/ms220938(VS.80).aspx; retrieved Aug. 26, 2008.

Microsoft, "Using Shims with the Application Verifier Tool," http://msdn.microsoft.com/en-us/library/bb154414.aspx; retrieved Aug. 5, 2008.

Qin, F. et al., "SafeMem: Exploiting ECC-Memory for Detecting Memory Leaks and Memory Corruption during Production Runs," http://carmen.cs.uiuc.edu/paper/HPCA05-SafeMem.pdf; retrieved Aug. 5, 2008.

Robertson, W. et al., "Run-Time Detection of Heap-Based Overflows," 2003 LISA XVII, Oct. 26-31, 2003, San Diego, CA, p. 51-60 http://www.cs.cornell.edu/Courses/CS513/2005FA/paper.heap-attacks.pdf.

University of Tokyo, "Detecting Heap Corruption," http://wwweic.eri.u-tokyo.ac.jp/computer/manual/lx/SGI_Developer/books/Debugger_UG/sgi_html/ch09.html; retrieved Aug. 5, 2008.

\* cited by examiner

218 Rules and Settings

| Application Identifier | Mitigation ticket value | Time mitigation enabled |
|---|---|---|
| Application 1 | Ticket 1 | Time 1 |
| Application 2 | Ticket 2 | Time 2 |
| Application 3 | Ticket 3 | Time 3 |
| . | . | . |

FIG. 2C

CONFIGURATION OF MEMORY MANAGEMENT TECHNIQUES SELECTIVELY USING MITIGATIONS TO REDUCE ERRORS

BACKGROUND

In multi-purpose computing devices, operating systems are typically, though not exclusively, used to manage memory of the computing device for use by one or more applications executing on the computing device. For example, if two applications access memory on the computing device, then the operating system may allocate portions of the memory for use by the two applications such that both can access memory without corrupting data stored by the other.

This management and arbitration may be necessary to alleviate problems that may arise if an application attempts to use memory being used by another. For example, if two applications both attempt to use the same portion of a memory in the same or overlapping time periods, then the second may overwrite the data of the first, and the first may be unable to execute properly or even crash. Errors such as these have a significant impact on the user experience, particularly if they occur frequently.

Operating systems typically include a memory manager to which an application may send requests to carry out memory management tasks, such that the memory manager can arbitrate between processes for use of memory resources. For example, if an application wishes to store data either temporarily or permanently, the application may request that the memory manager allocate some amount of memory to the application. Later, when the application no longer needs the memory, the application may inform the memory manager of that and request that the allocated memory be deallocated (or "freed") such that it may be used by another application. When a second application sends to the memory manager a request for memory, the memory manager may consult its records to determine portions of the memory that are not currently allocated, and allocate those to the second application.

Some software applications that may execute processes interacting with an operating system, for example, may include bugs or other programming flaws related to performing memory operations, and the software applications may fail as a result of memory errors even when the memory manager executes the memory operations correctly. These memory errors may result from inconsistencies that may arise between memory operations. For example, as described above, a software application may request that a first amount of memory be allocated to the application, and then write a second amount of data to the memory that is larger than the first amount. The inconsistencies between operations—in this example, the inconsistency in size between the first amount and the second amount—may cause memory errors that lead to failures in the software application. These failures could include improper executions caused by the memory errors, or even catastrophic errors or "crashes" that halt execution of the application.

Because of the effects of these programming bugs, software tools have been developed to attempt to identify programming bugs that cause these memory errors. These tools may be used during developmental testing of software applications.

For example, different types of "debugging" tools exist that may be used to identify bugs during developmental testing of software applications. Some software development applications, such as Visual Studio available from the Microsoft Corporation of Redmond, Wash., have tools such as these built in. In Visual Studio, a developer may choose to enable Application Verifier functionality during testing that may include the Page Heap functionality. Page Heap may be used to detect some memory errors including buffer over- and under-runs by monitoring allocation and usage of memory for the application being tested. In Page Heap, an amount of reserved extra memory (termed a "non-accessible page") is placed following an allocated portion of heap memory (the normal, "user allocation" page), and the Application Verifier functionality is enabled to detect when information has been written to the non-accessible page. In this way, the debugging tool may identify errors and report them to the developer.

Such debugging tools, however, may not be used during runtime of a software application. Other tools have been developed to collect crash information when a crash is caused by a memory error, the collected information when analyzed may be used to identify memory errors. Such attempts to resolve crashes experienced during runtime have traditionally been limited to detecting when such errors occur and reporting the conditions of the crash to a central aggregation point that may then inform the developer of the available information about the error. The developer can attempt to recreate or debug the error using this information, and then identify and resolve the bug. The Windows operating system available from the Microsoft Corporation offers such reporting functionality in its Windows Error Reporting (WER) system. In this system, when WER detects that an application has uncleanly exited—by, for example, crashing or otherwise exiting improperly—information regarding the state of the application, such as the contents of an instruction stack, may be bundled and reported to an aggregation server by WER. This information may also include a generic system error code identifying a class of error, but does not include information regarding the exact bug that caused the error.

SUMMARY

Applicants have recognized and appreciated that applications may operate more reliable, and a user experience improved, by using memory management to compensate for programming bugs in the software applications that cause memory errors. Applicants have recognized that many memory errors may be caused by inconsistencies in memory operations performed by the applications, and that the effects of these programming bugs may be mitigated by anticipating these inconsistencies and performing memory management in a way to correct for them. For example, by allocating more resources (such as memory and/or time) to an application than the application requests, a memory management module may compensate for a bug in the application that causes the application to access more memory than it requested or using memory after it signals it is done with the memory. Further, in some instances, a memory management module may mitigate errors by not executing memory operations requested by applications, for example, if it is detected that input information for the operations is incorrect.

Many different types of errors may be mitigated with different types of mitigation actions, examples of which are discussed in greater detail below. Applicants have appreciated, however, that mitigations such as these may have a significant impact on the efficiency of the computing devices and may impact performance of applications executing on those devices. Evaluating and manipulating a memory operation each time one is requested may add time to the completion of a request, and allocating more memory than requested uses more memory and thus may reduce resources available to the system. Applicants have appreciated the desirability of a memory management module having mitigations which is able to be selectively enabled per application.

In accordance with the principles described herein, a memory management module may be implemented that has different modes of operation for each of one or more software modules issuing to the memory management module requests for performance of memory operations. In one mode of operation, one or more mitigation actions may be performed by the memory management module in addition to or instead of the memory operation requested by the calling software module, such that the memory operations are performed in accordance with the mitigation actions. These mitigation actions may serve to reduce a likelihood of a memory error affecting the calling software module. In another mode of operation, the memory management module performs memory operations as requested, without performing mitigation actions. A memory management module may maintain a record in a data store associated with the memory management module, the record having at least one entry for each calling software module indicating the mode in which the memory management module should operate for the calling software module.

A memory management module may maintain a record in a data store associated with the memory management module, the record having at least one entry for each calling software module indicating the mode in which the memory management module should operate for the calling software module. These entries may be adjusted by the memory management module based on experiences of the module, such as successful mitigations detected or unmitigated errors detected, such that the memory management module can successfully adapt to changing conditions on the computing device.

Applicants have also recognized and appreciated that more than one computing device may, in some cases, execute a particular software module, such as in the case of widely-distributed software applications. In accordance with the principles described herein, records maintained by each of these computing devices may be aggregated at one or more computing devices, such as at a central server, and this information may be used to adjust the entries on each of the computing devices. For example, statistics may be collected at each of the computing devices and transmitted to the central server, and the central server may aggregate these statistics to determine overall statistics for success of mitigation actions in reducing a number of memory errors that negatively affect a particular software module. The central server may then issue instructions to the computing devices in accordance with these instructions. These may be any suitable instructions including, for example, statistics against which the computing devices should measure success of the mitigation actions. For example, the instructions may comprise an indication that a greater or fewer number of instances of an application should be considered prior to determining whether to disable mitigations for the application.

Operating a memory management module in accordance with some or all of the principles described herein offers a number of advantages, including reducing a likelihood of software modules such as user applications executing improperly or crashing, which may serve to improve a user experience while using these software modules.

It should be appreciated that the foregoing is intended to be a non-limiting summary of the invention, which is defined only by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2C is a schematic illustration of a data structure in a computer storage medium that may be used to implement memory mitigations on an application-by-application basis;

DETAILED DESCRIPTION

Figure 1:
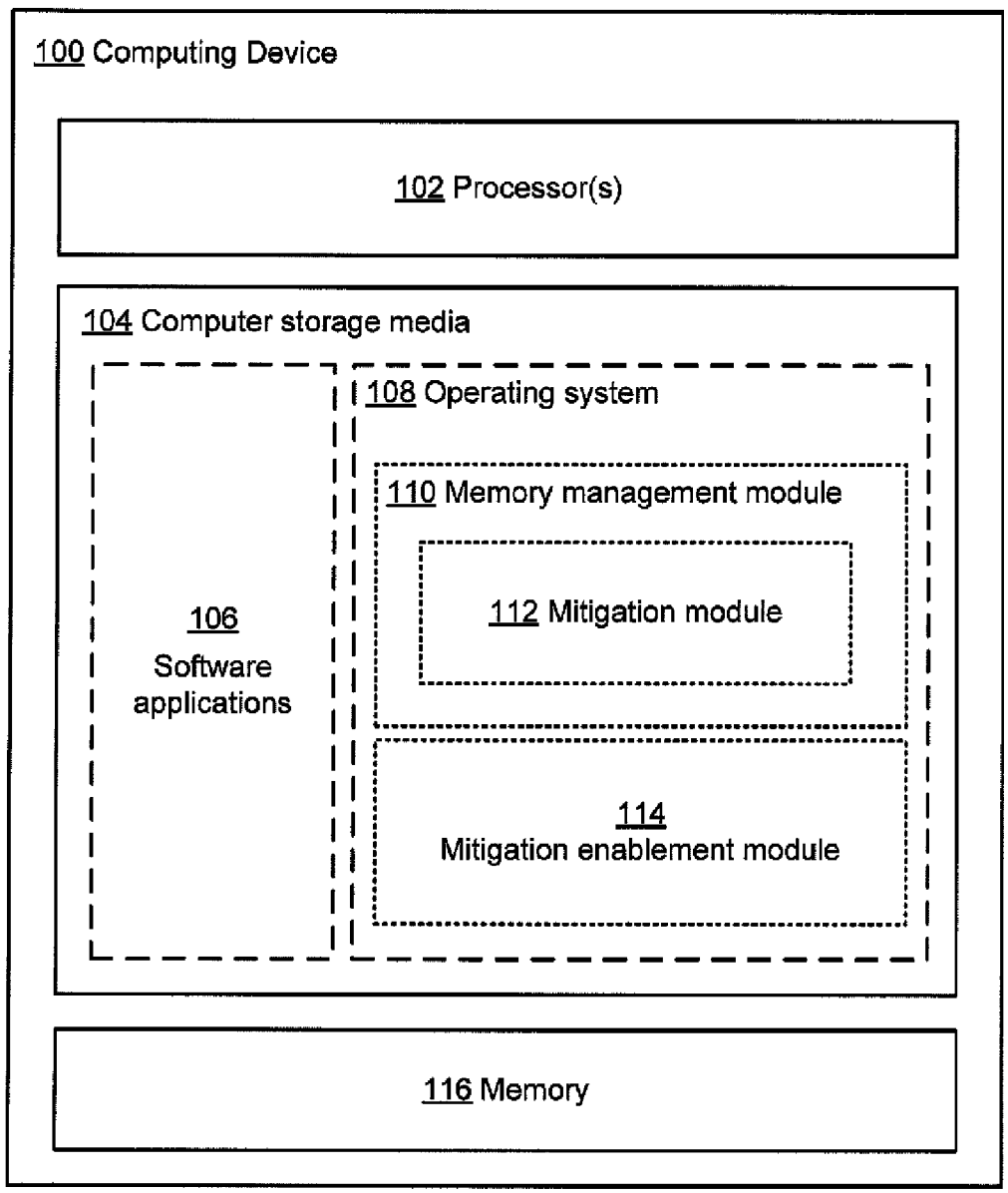
FIG. 1 is a block diagram of an exemplary computing device in which techniques operating according to some of the principles described herein may act.

Resource management modules operate in systems having a shared resource, and act as arbiters of that shared resource to ensure that multiple consumers of it do not interfere with one another when attempting to access the resource. A memory management module is one example of such a resource management module. Some computing devices, including single- and multi-purpose computing devices, may execute in parallel applications or other instruction sets related to two or more tasks, and these parallel executions may compete for access to memory. If the two or more applications are coded properly and instructions given to the memory management module are correct, then memory management may be a relatively simple task. Applicants have recognized that, unfortunately, this is not always the case, and applications or instruction sets may crash as a result of programming bugs that cause memory errors. Research by the Microsoft Corporation of Redmond, Wash., for example, has found that programming bugs in user software applications running in the Windows® operating system cause memory errors that are the source of a significant number of application crashes every day—about 15 percent of the total number of crashes analyzed in the study.

Applicants have recognized and appreciated that the effects of programming bugs in applications may be mitigated through the use of an improved memory management module that takes steps to reduce the probability of a programing bug causing an error affecting negatively an application. For example, by allocating more resources to the application than the application requests, a memory management module may compensate for bugs in the application that lead to the application using more memory than requested or using memory after the application signals it is done with the memory. Further, in some instances, a memory management module may mitigate errors by not executing memory operations requested by applications making the calls for the memory operations to be performed. For example, if the memory management module detects that input information for the operations is incorrect, it may not execute the operation. Many different types of errors may be mitigated with different types of mitigation actions, examples of which are discussed in greater detail below. It should be appreciated, however, that many different types of mitigation actions are possible beyond those listed below, as any suitable action may be taken to mitigate programming bugs that cause memory errors.

Applicants have also recognized and appreciated that, in some cases, mitigation actions may have an adverse impact on performance of an application or other instruction set. For example, allocating more memory to an application than requested, or delaying before freeing memory for use by another application, causes a computing device to use more memory than it otherwise would. Additionally, by examining memory operations as they are received by the memory management module to determine whether mitigation actions are available, the time to respond to these memory operations is increased, resulting in increased execution time for applications. Applicants have recognized and appreciated that, because not all software modules calling a memory manager ("calling software modules") will have programming bugs that lead to memory errors, this adverse affect on performance may be moderated by selectively applying mitigation actions for calling software modules, depending on whether they have been detected to have experienced memory errors. Described herein, therefore, are techniques for performing a memory operation in different modes of operation for each particular calling software module that is an instance of an application, such as a first mode in which mitigation actions are applied to memory operations for an application and a second mode in which they are not applied for an application.

Additionally, Applicants have appreciated that it may not be efficient to always perform memory operations for a calling software module in a mitigation mode. For example, in some implementations, a memory management module may not be configured to mitigate all memory errors that may be experienced by a calling software module, and a particular calling software module may have programming bugs that may not be mitigated by the particular memory management module implemented on the computing device. As another example, some calling software modules may have programming bugs in some infrequently-executed instructions. As another example, a calling software module may have very few bugs that result in memory errors. In each of these cases, while operating a memory management module in a mitigation mode for the calling software module may help mitigate some errors, these mitigatable errors may be infrequent, and the losses in efficiency resulting from operating in the mitigation mode may outweigh the gains in mitigating the errors.

Applicants have recognized and appreciated, therefore, the desirability of testing to determine the effectiveness of operating a memory management module in a mitigation mode and configuring the memory management module in response to the testing. Determining the effectiveness may be done in any suitable manner. For example, a mitigation action may be determined to have effectively or successfully mitigated a memory error if it is detected that the memory error did not affect a software module even though the programming bug that caused the error is present in the module. This testing may be performed over time and over a plurality of instances of an application, to collect statistics on whether the mitigation actions are effective, including statistics on a number and/or frequency of errors and of detected successes of mitigations actions. These statistics may take any suitable form, including as a ticket value that is incremented in the case mitigation actions are successful at avoiding an impact on a calling application even though a bug is present in one instance and decremented when mitigation actions are not successful in another instance. Any suitable criteria may be used to determine whether a mitigation is successful or unsuccessful. In some embodiments, the mitigation may be deemed not successful if no bugs of the type that can be mitigated are detected. Though, in other embodiments other different or additional criteria may be applied. As an example of behavior that results from selecting applying mitigations based on prior success of the mitigations, a memory management module may be configured to operate in a mitigation mode when performing memory operations for a particular software module that is an instance of an application. This mode may be entered after a crash or other error attributed to a memory function. If it is determined that the mitigations are not effective at preventing memory errors from affecting the module after some period of time the memory management module may be configured to operate in a normal mode, without mitigations, for subsequent instances of the particular application. The period of time may be measured chronometrically and/or in some other way such as based on number of clean exits from the application without a successful mitigation. Described below are exemplary tests that may be used to make such a determination, the results of which may be used to control the mode in which a memory management module operates for a particular calling software module.

Applicants have further appreciated that some software modules, such as those associated with widely-released software applications, may be executed on multiple computing devices, and that each of these computing devices may have experience with these software modules and whether mitigations actions are effective. For example, other computing devices may have experience with determining whether the mitigation actions are successful or unsuccessful. Applicants have recognized and appreciated that performance of a computing device can therefore be further improved by leveraging the experiences of other computing devices to make decisions whether or for how long to apply mitigation actions for an application.

To take advantage of aggregated information, a computing device may be adapted to transmit detailed information on types of errors and successes of mitigation actions to one or more other computing devices collecting information from multiple devices, all of which may be executing software modules that are instances of an application. Such a device or devices may aggregate information about success of mitigations with respect to a particular application. Based on this aggregated information, a device also may receive configuration information from the one or more computing devices on whether to apply mitigation actions for a particular software module. The information may be in any suitable form, such as information regarding statistics against which success of mitigation actions may be measured. For example, the configuration information may comprise an indication that a greater or fewer number of instances of an application should be considered prior to determining whether to disable mitigations for the application. In some such implementations, the instructions may comprise an initial mitigation ticket value that may be used in accordance with testing techniques described herein to determine whether to disable mitigations for an application. Accordingly, described below are techniques for transmitting information to and receiving information from other computing devices that may be used for configuring a memory management module on a computing device for applying mitigation actions.

It should be appreciated that in specific embodiments techniques may be implemented in accordance with some of the principles described herein without each embodiment using all of the principles. Any suitable combination of one or more of these principles may be implemented, as embodiments of the invention are not limited to being implemented with any specific principle or set of these principles. For example, a memory management module may be implemented that selectively applies mitigation actions but does not test the effectiveness of the mitigation actions or accept configuration data from other computing devices, or that selectively applies mitigation actions and tests effectiveness but does not accept configuration data from other computing devices.

The techniques described below can be implemented in any of various ways and operate on any of various types of instruction sets. For simplicity, the examples below describe the memory management module and error reporting services as portions of an operating system of a computing device, and the software modules as applications managed by the operating system. Such an example can be seen in one commercial implementation of some of the principles described herein, wherein the operating system is Microsoft Windows®, the mitigation module described below is a Fault Tolerant Heap (FTH) client, the mitigation enablement module described below is an FTH server, and the error reporting client and server are components of the Windows® Error Reporting (WER) service. It should be appreciated, however, that this is merely one example of the diverse manners in which the principles described herein may be implemented, and that others are possible. For example, a memory management module may be implemented as a stand-alone component that interacts with an operating system of a computing device, as a component of an application managed by an operating system, or as a module executing on a computing device that does not have an operating system. Further, the software modules issuing requests to the memory management module (the "calling software modules") may be any suitable arrangement of instructions that may be executed by a processor. In some implementations, the software module may be an instance of a user application, a component of an operating system, a service or daemon, or any other suitable software module. Each software module may be one or more "functional modules" as described below.

Additionally, a memory management module can be implemented to perform any suitable combination of one or more memory operations as well as any suitable combination of one or more mitigation actions. A memory operation can be any suitable operation that affects the use of memory resources, such as allocation, deallocation (freeing), reallocation, paging, and many others. A mitigation action can be any suitable action that may be taken by a memory management module to reduce the likelihood that a programming bug in a calling software module will result in a memory error and negatively impact the calling software module, such as by causing an improper execution or crash.

A memory error can be any error that results in memory corruption that may negatively impact a software module, such as by causing improper execution or a crash. In many cases, memory corruption may be caused by programming bugs that result in inconsistencies between memory operations. Memory errors include writing outside the boundaries of allocated memory (a buffer over- or under-run), an overwrite of stored information by another software module when two modules are each using the same memory space in overlapping time periods, or using a different portion of memory than was allocated to the module. It should be appreciated that these memory errors are merely exemplary of the types that may be experienced by a software module and mitigated by some of the principles described herein.

Mitigating memory errors may be done in any suitable manner by performing any suitable one or more mitigation actions. In some cases, mitigation actions may comprise actions taken in expectation of inconsistent memory operations and that may seek to counteract the inconsistencies. Exemplary mitigation actions are described in greater detail below, but may include any action of changing an operation prior to executing it, not executing an operation, executing an operation at a later time, confirming correct input for an operation prior to executing it, or performing an operation with minimal changes to memory space.

Further, exemplary implementations are described below with memory management modules that operate with one type of memory commonly referred to as "heap" memory. It should be appreciated, however, that any one or more suitable type(s) of memory may be managed by techniques operating in accordance with some of the principles described herein, including stack memory and/or global variable memory.

In one exemplary implementation of the principles described herein, a calling software module (which may be, for example, an instance of a software application) may issue a request to perform a memory operation to a memory management module. The memory management module may interact with a mitigation enablement module. A mitigation enablement module may consult one or more entries of rules and settings data stored by the enablement module to determine a mode in which the memory management module should operate when performing operations for the particular calling software module. Consulting the rules and settings data may, in this and some other implementations, include checking to determine whether one or more statistics are above or below a threshold level. If the rules and settings indicate that the memory management unit should not operate in a mitigation mode—for example, if the mitigation ticket value is below the threshold level—then the memory operation is performed as requested. If, however, the rules and settings indicate that that memory management unit should operate in a mitigation mode, then a mitigation module of the memory management unit may be enabled. The mitigation module may then perform, in conjunction with the memory management module, the memory operation in accordance with one or more mitigation actions that may serve to reduce a likelihood of a memory error negatively impacting the calling software module. It should be appreciated that the mode of operation of the memory management module is preferably independent per software module, and that the memory management unit may perform a memory operation in a first mode for one calling software module and perform another memory operation in a second mode for another calling software module.

In the exemplary implementation, the mitigation and mitigation enablement modules may also be adapted to evaluate whether the one or more mitigation actions, once enabled, are successful at mitigating errors. This may be done in any suitable manner, examples of which are discussed below. For example, when a mitigation action is performed, initial observations may be taken and compared to observations recorded later to determine whether the calling software module may have taken any actions that may be indicative of a programming bug that may have been prevented from causing an error by the mitigation actions. For example, as discussed below, during an allocation operation a larger amount of memory may be allocated than requested, and marker values may be written to the extra memory. When the calling software module later requests that the memory be deallocated, the mitigation module may check the extra memory to see that the marker values are still in the memory. If some or all of the marker values have been overwritten, then the mitigation module may determine that the mitigation action (allocating the extra memory) was effective at preventing a memory error caused by a buffer overrun. Further details of evaluating the effectiveness of mitigation actions, and other exemplary tests, are discussed below. In some implementations that use a mitigation ticket value, when a mitigation action is determined to have been effective for a particular calling software module, then the mitigation ticket value may be incremented, and if the mitigation action is determined not to have been effective or to have had no effect, then the mitigation ticket value may be decremented.

In this implementation, the mitigation and mitigation enablement modules may be further adapted to transmit information to and receive information from remote computing devices regarding the effectiveness of mitigation actions at preventing memory errors from negatively impacting software modules and on whether to enable the mitigation actions. For example, when a memory management module detects that a calling software module has crashed, it may determine from records whether any memory errors were detected and whether any of these memory errors were mitigated. It may then transmit this information to one or more other computing devices and may in return receive information from the one or more other computing devices. In this exemplary implementation, but not all implementations, the one or more other computing devices may comprise an aggregation server, and the aggregation server may also serve as a portion of an error reporting service such as the Windows Error Reporting service. The aggregation server may accept error and mitigation information from one or more computing devices and may transmit this information to vendors including the developers of the software module that was detected to have crashed. The aggregation server may also determine whether the mitigation actions are, at each of the computing devices, successful at mitigating the memory errors and may inform the computing devices whether to enable mitigation mode for a particular software module. In some implementations, informing the computing devices whether to enable the mitigation mode may comprise transmitting a recommended initialization value for the mitigation ticket value, such as a higher value when the mitigations have historically been successful or successful at a high rate and a lower value when the mitigations historically have not been successful or have been successful and at only a low rate, but it should be appreciated that other implementations may operate with any suitable configuration information as embodiments of the invention are not limited in this respect.

It should be appreciated that while this exemplary embodiment is described as operating according to many of the principles described herein, other implementations may operate according to a greater or fewer number of these principles, and that not all implementations may operate according to all of the principles described herein.

As discussed briefly above, Applicants have appreciated that many different types of programming bugs may cause memory errors that may negatively impact a software module, such as by causing the software module to execute improperly or crash. For context, some of the most common of these programming bugs are described below, but it should be appreciated that this listing of errors is not comprehensive of all programming bugs that may be mitigated by implementation of some of the principles described herein, and that others exist that may be mitigated using techniques operating in accordance with some or all of these principles.

As a first example, a calling software module may request that a memory management module allocate a certain amount of memory to the software module—for example, 16 bytes—and then attempt to use more memory than requested—for example, 17 bytes or more. A conventional memory management module cannot detect that the software module is using the extra memory, and may allocate that memory to another software module. If the other software module then starts using the memory, the one or both software modules may execute improperly or even crash as a result of a memory error when it/they attempt to use the memory.

As a second example of a programming bug that may cause a memory error, a software module may request that the memory management module allocate some memory to the software module, then inform the memory management module that it is done with the memory, but then continue to use the memory. According to the memory management module's records, the memory is free to be allocated to another software module, and both may attempt to use the memory at the same time, causing one or both to execute improperly.

As a third example, a software module may "free" memory that has been allocated to it by informing the memory management module that it is done with the memory, and then may free that memory again through a programming bug. The memory management module may have, in the interim, allocated that memory to another software module, and may, as a result of the second, improper free operation allocate it to a third software module. One or both of the second and third software modules may then execute improperly as a result of a programming bug in the first.

As a fourth example, some software modules, upon exiting, may attempt to free all memory allocated to them, but may do so prematurely or otherwise incorrectly and a crash of the software module may result.

As a fifth example, different information may be stored in different types of memory, such as general address space, stack memory, and dynamic or heap memory. Some instruction sets may, through programming bugs, use the wrong commands to interact with memory of different types, such as using a heap memory operation to perform an operation intended to be done on general address space memory. When the memory management module performs the operation on heap memory using an identifier for general address space memory, then, it is operating on the wrong memory, and the software module making the call or the instruction set using the heap memory may crash as a result.

As a sixth example, in a reallocation operation to reduce or enlarge an allocation of memory to an instruction set, the memory allocation may be moved to another portion of the memory, but through a programming bug the instruction set may continue to refer to the memory in the original location. The instruction set and any other instruction set(s) using that original memory may therefore crash as a result of the bug.

By operating according to the principles described herein, memory management modules may prevent these and other programming bugs from causing memory errors that negatively impact software modules by causing improper execution or even crashes. Negative impacts on software modules may have a negative impact on a user experience, and mitigating the effects of these programming bugs may significantly improve a user experience. Additionally, by operating to enable selectively the mitigation actions and testing their effectiveness, any negative impacts of these mitigation actions may themselves be mitigated.

Additional functions and advantages of these and other techniques operating in accordance with the principles described herein will be more fully understood from the examples described below. The following examples are intended to facilitate an understanding of the invention and to illustrate the benefits of the principles described herein, but do not exemplify the fill scope of embodiments of the invention.

Techniques operating in accordance with principles described herein may be implemented in of various computing systems, examples of which are described in greater detail below. Such systems generally involve the use of suitably-configured computing devices implementing a number of functional modules, each providing one or more operations needed to complete execution of such techniques. Each functional module may be implemented in its own way; all need not be implemented the same way. As used herein, a functional module is a structural component of a system that performs an operational role. The operational role may be a portion of or an entire software element. For example, a functional module may perform a function of a process, a discrete process, or any other suitable unit of processing. A functional module may comprise computer-executable instructions, and may be encoded on a computer storage medium. Additionally, such computer-executable instructions may be written using any of a number of suitable programming languages and/or programming or scripting tools, and also may be compiled as executable machine language code or intermediate code that is executed on a framework or virtual machine. Functional modules may be executed in parallel or serially, as appropriate, and may pass information between one another using a shared memory on the computer on which they are executing, using a message passing protocol or in any other suitable way. Exemplary functional modules are described below carrying out one or more tasks, though it should be appreciated that the functional modules and division of tasks described is merely illustrative of the type of functional modules that may implement the exemplary techniques described herein, and that the invention is not limited to being implemented in any specific number, division, or type of functional modules. In some implementations, all functionality may be implemented in a single functional module. Further, the functional modules are discussed below, for clarity, as all executing on one or two computing devices, though it should be appreciated that, in some implementations, the functional modules may be implemented on many separate computing devices or separate processors of a single computing device adapted to communicate with one another. For example, one processor may be adapted to execute a calling software module that issues a request to a memory management module to perform a memory operation, and another processor may be adapted to execute the memory management module.

In some exemplary embodiments described below, techniques operating according to the principles described herein may be implemented as computer-executable instructions encoded on one or more computer-readable storage media such as magnetic media (e.g., a hard disk drive), optical media such as a Compact Disk (CD) or a Digital Versatile Disk (DVD), a persistent or non-persistent solid-state memory (e.g., Flash memory, Magnetic RAM, etc.), or any other suitable storage media. The computer storage media may be implemented as computer-readable storage media 104 of FIGS. 1 and 9 (i.e., as a portion of a computing device 100) or as a separate computer storage medium. It should be appreciated that, as used herein, a "computer-readable medium," including "computer-readable storage medium," refers to tangible storage media having at least one physical structure that may be altered in some way during a process of recording data thereon. For example, a magnetization state of a portion of a physical structure of a computer-readable medium may be altered during a recording process. In some such embodiments, the computer-executable instructions implementing the techniques operating in accordance with the principles described herein may be implemented as one or more stand-alone functional modules (e.g., the memory management module).

Where the techniques described herein are embodied as computer-executable instructions, they may be executed on any suitable computing device(s) operating in any suitable computer system, including the exemplary computing devices of FIGS. 1 and 9 described below. For example, techniques operating according to some or all of the principles discussed herein may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

FIG. 1 illustrates one exemplary implementation of a computing device in the form of a computing device 100 that may be used in a system implementing the techniques described herein, although others are possible. Further, it should be appreciated that FIG. 1 is intended neither to be a depiction of necessary components for a computing device to operate in accordance with the principles described herein, nor a comprehensive depiction. It should be further appreciated that other implementations may operate in any other suitable computing devices.

Computing device 100 may comprise a processor 102, computer-readable storage media 104, and a memory 116. Computing device 100 may be any suitable computing device including, for example, a desktop or laptop personal computer, a workstation, a server, a mainframe, a smart phone, a Personal Digital Assistant (PDA), a stand-alone networking device, or any other suitable computing device able to execute one or more software modules at a single time and having one or more resources that may be shared between the one or more software modules, such as memory. Computer-readable storage media 104 may be any suitable tangible storage medium adapted to store data to be processed and/or instructions to be executed by processor 102. Processor 102 enables processing of data and execution of instructions. The data and instructions may be stored on the computer-readable storage media 104 and may, for example, enable communication between components of the computing device 100.

The data and instructions stored on computer-readable storage media 104 may comprise computer-executable instructions implementing techniques which operate according to the principles described herein. In the example of FIG. 1, computer-readable storage media 104 stores computer-executable instructions implementing various modules and storing various information as described above. Computer-readable storage media 104 stores data and instructions relating to one or more software modules 106 that may execute on the computing device 108 and an operating system 108 that may govern execution of processes on the computing device 100 and regulate use of shared resources such as memory 116.

To regulate use of the memory, the operating system 108 may have a memory management module 110 to perform memory operations requested by calling software modules. The calling software modules may be the software applications 106, other components of the operating system 108, or any other software element executing on the computing device 100. Memory management module 110 may be implemented in any suitable manner to perform conventional memory management techniques as well as one or more of the techniques described herein. As discussed above, in some implementations of the techniques described herein, a memory management module 110 may comprise a mitigation module 112 that may serve to perform one or more mitigation actions as memory operations are requested by calling software modules. The mitigation module 112 may be selectively applied, per calling software module, such that mitigation actions are performed only for software modules that are detected as needing the mitigation actions. To perform detection and enablement in these implementations, therefore, the operating system 108 may further comprise a mitigation enablement module 114 to monitor the execution of software modules in the computing device 100. In alternative implementations, however, a mitigation mode may be manually enabled or disabled, such as by an administrator of the computing device 900, and in such implementations no mitigation enablement module may be provided. The modules shown in FIG. 1, including the mitigation module 112 and the mitigation enablement module 114, can be adapted to operate in any suitable manner in accordance with the principles described herein, including by any of the exemplary techniques described below.

It should be appreciated that the implementation shown in FIG. 1 is merely exemplary of the diverse manner in which the principles described herein may be implemented. In alternative implementations, the mitigation module and the mitigation enablement module may be implemented as a separate component from the operating system, or may be implemented as a single component within the operating system, or in any other suitable manner, as embodiments of the invention are not limited to being implemented as any particular module or set of modules.

Figure 2A:
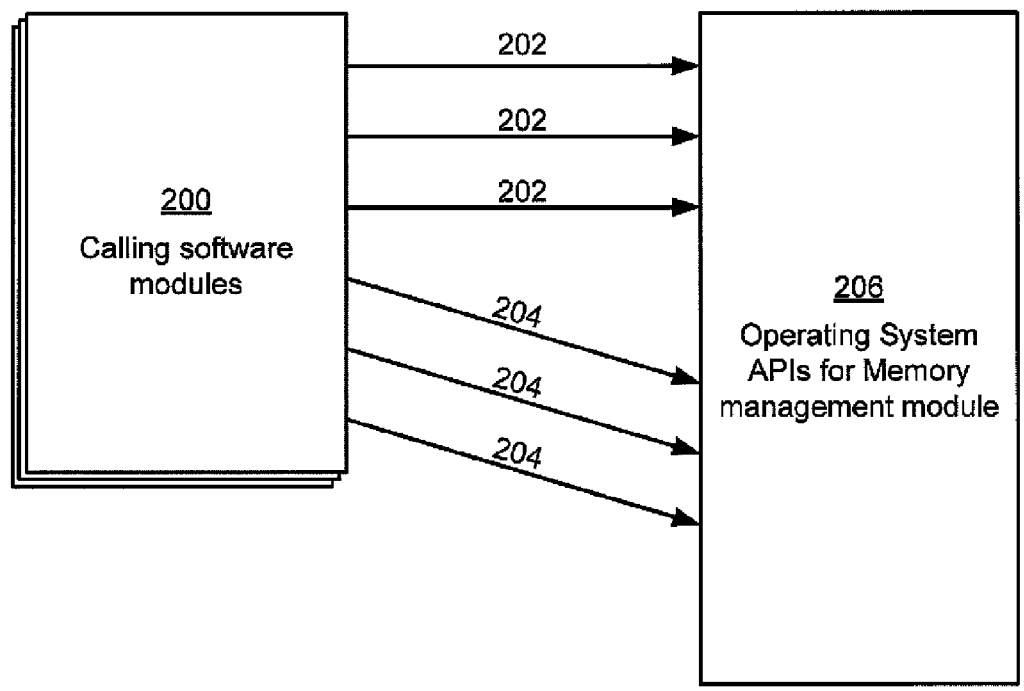
FIG. 2A is a schematic of interactions between components of a system operating according to conventional techniques for memory management.
Figure 2B:
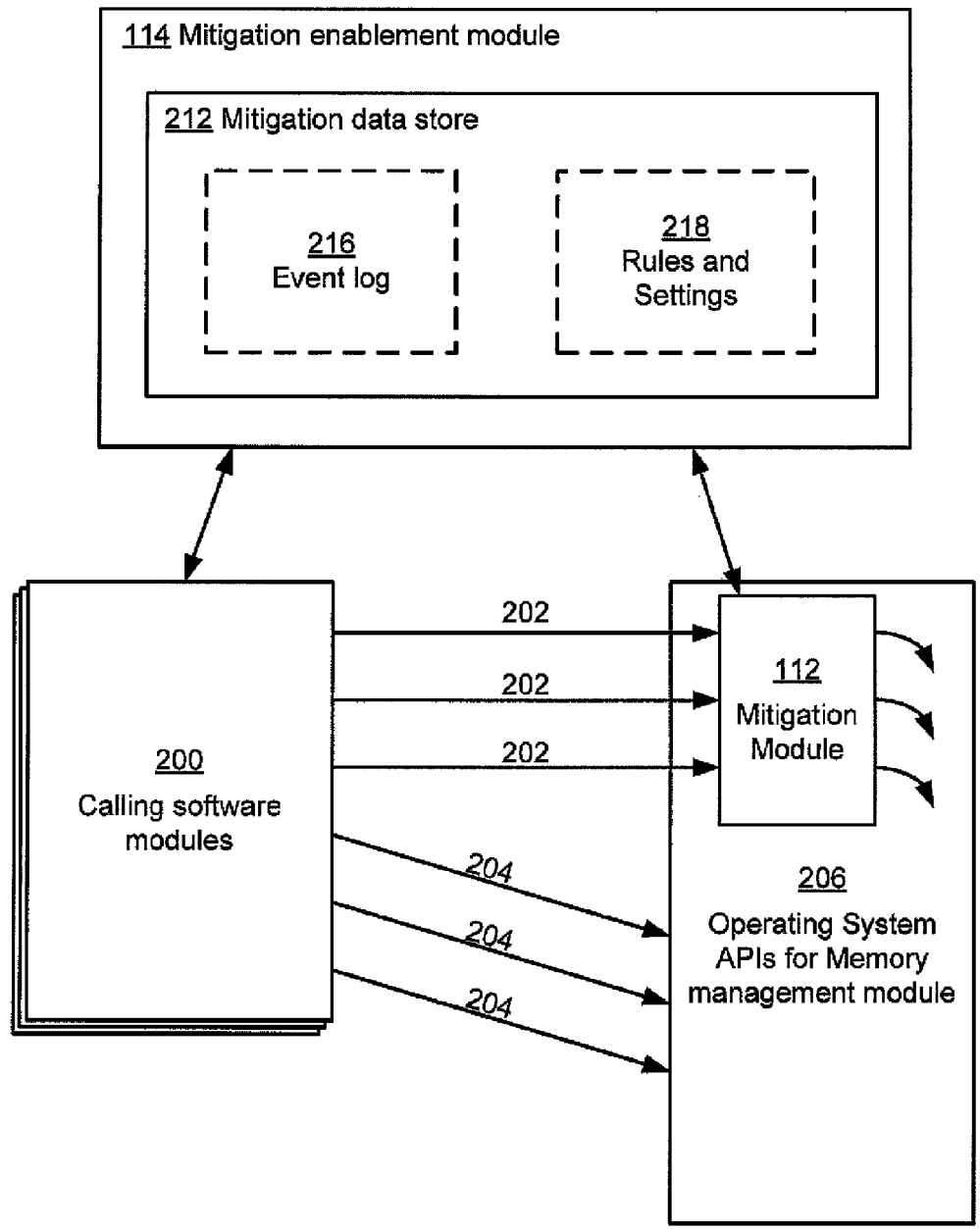
FIG. 2B is a schematic of some of the interactions between some of the components of one exemplary system in which techniques operating according to some of the principles described herein may act.

The distinction between a conventional memory management module and a memory management module operating according to the implementation illustrated in FIG. 1 is illustrated in FIGS. 2A and 2B. In FIG. 2A, a plurality of calling software modules 200 are shown issuing operation requests 202 and 204, including requests for the performance of memory operations, to the operating system APIs and memory management module 206. These operations are carried out as requested, and any suitable information returned to the calling software module. No mitigation actions are available, and no monitoring of the calling software application is performed, such that these software modules may be susceptible to memory errors caused by the programming bugs including those described above.

In FIG. 2B, the exemplary implementation of FIG. 1 is shown, with the mitigation module 112 implemented as a component of the operating system. In this implementation, calling software modules 200 issue the same operation requests 202 and 204 to the operating system and memory management module 206, as these software modules are in the embodiment illustrated unaware of the mitigation module 112 and whether it is implemented for the particular calling software module. As discussed above and as shown in FIG. 2B, the mitigation module 112 may be selectively applied per calling software module to perform one or more mitigation actions and thus some, but not necessarily all, of the operation requests issued by the calling software modules 200 are intercepted by the mitigation module 112. To determine whether the mitigation module 112 should be enabled for a particular calling software module, a mitigation enablement module 114 is in communication with the memory management unit 110 and mitigation module 112, as well as with the calling software modules 200.

Upon detecting that a request for performance of a memory operation has been transmitted by a calling software application, the mitigation enablement module 114 may review information stored in a mitigation data store 212 associated with the mitigation enablement module 114 to determine whether the mitigation module should operate in a mitigation mode when performing the requested memory operation. This may also be considered a data store associated with the memory management module 110, as it maintains information related to operation of the memory management module 110 and, in some implementations mentioned above, may be a portion of the memory management module 110 when the mitigation enablement module 114 is implemented as a portion of the memory management module 110. Reviewing the information stored in the data store 212 may comprise any suitable action, including reviewing an event log 216 and rules and settings 218. The data store 212 may be stored in a persistent manner, such that if the mitigation enablement module 114 is disabled or shut down, when it is later re-enabled it will have access to information previously collected, including information on decisions previously made.

The data store 212 may store an event log 216 that comprises information about memory errors experienced by calling software modules 200, memory errors that have been detected as mitigated, and memory operations requested to be performed. Each entry in the event log 216 may comprise any suitable information, including bucketing parameters such as a name of the software module, a version for the software module, what library or portion of the software module was being executed at the time of the error, at what point in the execution was the error detected, and the exception code describing the error, as well as any other suitable information. The rules and settings 18 may store any suitable information about one or more calling software modules 200 as well as information about general mitigation policies. FIG. 2C shows one example of information that may be stored in the rules and settings 218. Rules and settings 218 may comprise an entry for each of the plurality of calling software modules 200, including for each an identifier for the calling software module that may be an application identifier, one or more values that may be used in determining whether a mitigation mode should be enabled for the calling software module, and a time that mitigation was enabled if so. The one or more values that may be used in determining whether the mitigation mode should be enabled may be any suitable values, including one or more statistics that may be collected regarding errors experienced by a software module and/or detected successes of mitigation actions across one or more instances of an application with which a calling software module is associated. These statistics may take any suitable form. In some implementations the statistics may take the form of a mitigation ticket value that may be incremented in the case of a detected success and decremented in the case of a detected error. The mitigation ticket value may then be compared to other statistical values, such as threshold values, to determine whether mitigation mode should be enabled for subsequent instances of the application. It should be appreciated, however, that statistics are only one example of the types of values that may be stored in the rules and settings 218, and that mitigation ticket values are only one example of the types of statistics that may be stored.

The mitigation enablement module 114 may review this information in any suitable manner to determine whether to enable a mitigation mode for a particular software module, including by any of the exemplary techniques discussed below.

Figure 3:
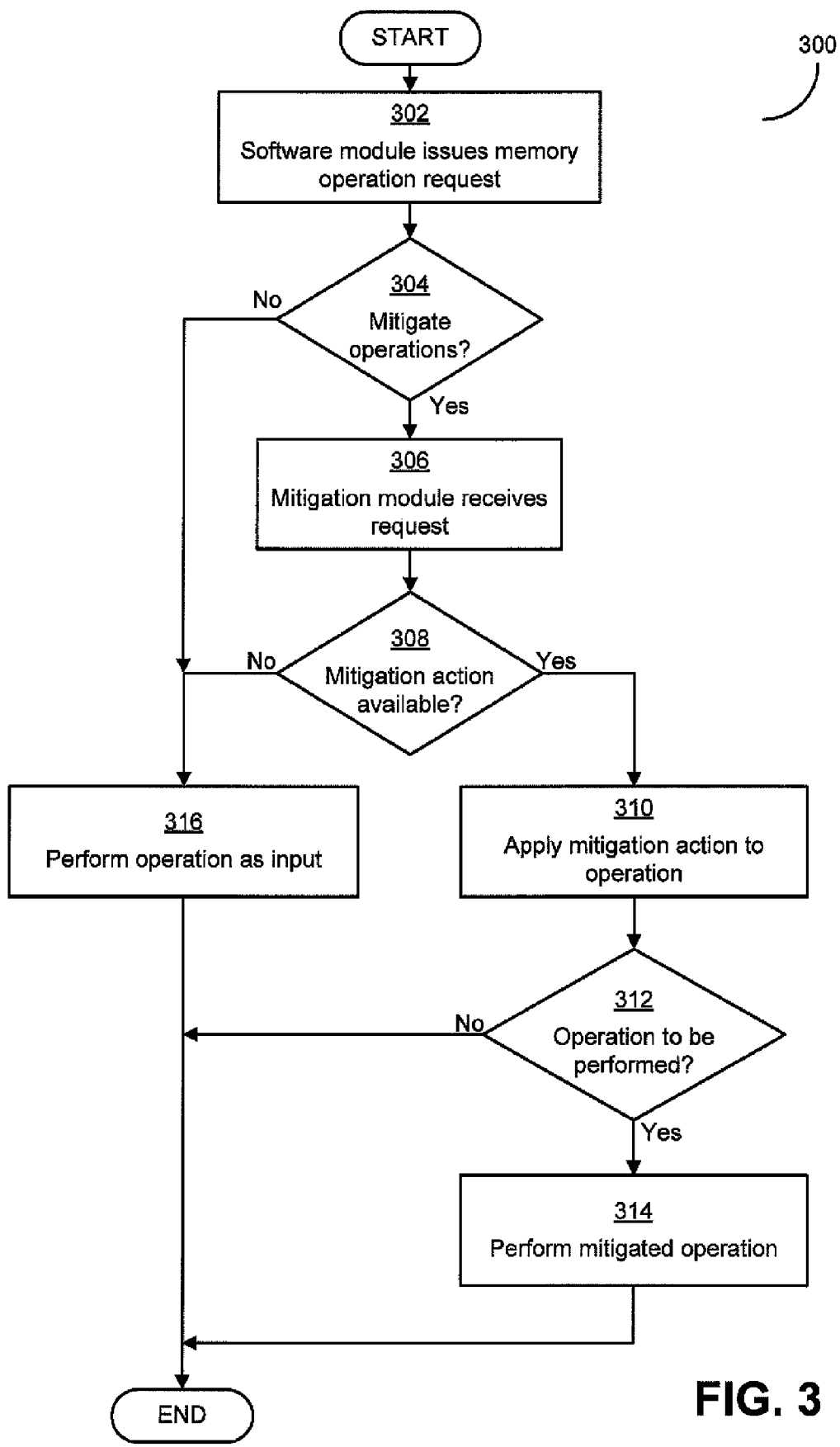
FIG. 3 is a flowchart of an exemplary technique for performing memory management according to some of the principles described herein.

To provide context for a discussion of exemplary techniques for determining whether to enable mitigation mode for a particular software module, exemplary techniques for the operation of the mitigation module 112 when it is in the mitigation mode is described first. Mitigation actions, including the examples described generally above and those described more specifically below, may be performed in any suitable manner, and a mitigation mode to carry out those mitigation actions may be performed in any suitable manner. FIG. 3 shows one example of a manner in which the mitigation module 112 may operate in a mitigation mode that may be implemented by the embodiments of the invention that operate a memory management module selectively in a mitigation mode, but others are possible as memory management modules may be implemented in any suitable fashion in accordance with the principles described herein, including by not operating in two different modes.

The illustrative process 300 of FIG. 3 begins in block 302, wherein a calling software module issues a request to have a memory operation performed by the memory management module 110. In block 304, it is determined whether, for the particular calling software module issuing the request, the memory management module 110 should operate in mitigation mode to perform one or more mitigation actions (in some cases below, for simplicity, this may be described as whether the software module is operating in mitigation mode, but it should be appreciated that this is done purely for ease of description and that preferably the software modules are unaware of the mitigation module and the mode in which it is operating). If it is determined that the memory management module 110 should operate in a mitigation mode, then the mitigation module 112 is enabled and, in block 306, receives the request to perform the memory operation.

Upon receiving the request in block 306, the mitigation module 112 and the memory management module 110 may perform the memory operation in accordance with the mitigation action. In some implementations, this may comprise performing a single action or may comprise performing many actions. In the illustration of FIG. 3, performing the memory operation in accordance with the mitigation action has been shown, for clarity, as four separate operations, but it should be appreciated that this is merely for ease of visualization, and that techniques operating in accordance with FIG. 3 may not be implemented precisely as shown.

In block 308, the mitigation module 112 determines, based at least on the type of memory operation requested and the input parameters for the operation, whether it is adapted to perform any mitigation actions. This may be done because, in some implementations, the mitigation module 112 may only be configured to mitigate one or more types of memory errors that result from a set of one or more memory operations, and as such may not have mitigation actions that it may perform for a particular memory operation. In some alternative implementations, a memory management module 112 may be implemented that is adapted to perform mitigation actions for all types of memory operations, and thus may not implement a process having a decision block 308.

If it is determined in block 308 that there is at least one mitigation action available, then in block 310 the mitigation action is performed, which may comprise applying the mitigation action to the operation. Applying the mitigation action to the memory operation may comprise any suitable procedure(s), including any of those discussed in detail below. For example, applying the mitigation action may comprise evaluating the memory operation, such as determining whether input parameters for the operation are correct; adjusting the parameters of the memory operation, such as increasing an amount of requested memory; waiting to perform the memory operation until a later time; or not performing the memory operation. In block 312, after the mitigation action is applied, it is determined whether the memory operation is still to be performed. If so, then in block 314 the mitigated operation is performed and the process 300 ends. If, however, it is determined in block 312 that the memory operation is not to be performed—for example, if the mitigation action is not performing the memory operation or if it is determined that the input parameters are incorrect—then the process 300 ends as well.

Returning to block 304, if it is determined that the memory management module 110 should not operate in a mitigation mode, or if it is determined in block 308 that no mitigation action is available, then in block 316 the memory operation is performed as requested, and the process 300 ends. Execution at block 316 may be as in a conventional memory manager, though any suitable method of execution may be used.

FIGS. 4A, 4B, 4C, and 4D illustrate four different processes that may be undertaken by a mitigation module 112 to perform at least one mitigation action, such as in block 310 of FIG. 3. It should be appreciated that these processes are only illustrative of the types of processes that may be implemented to carry out these mitigation actions and, further, that these mitigation actions are only exemplary of the types of mitigation actions that may be carried out by a mitigation module 112.

Figure 4A:
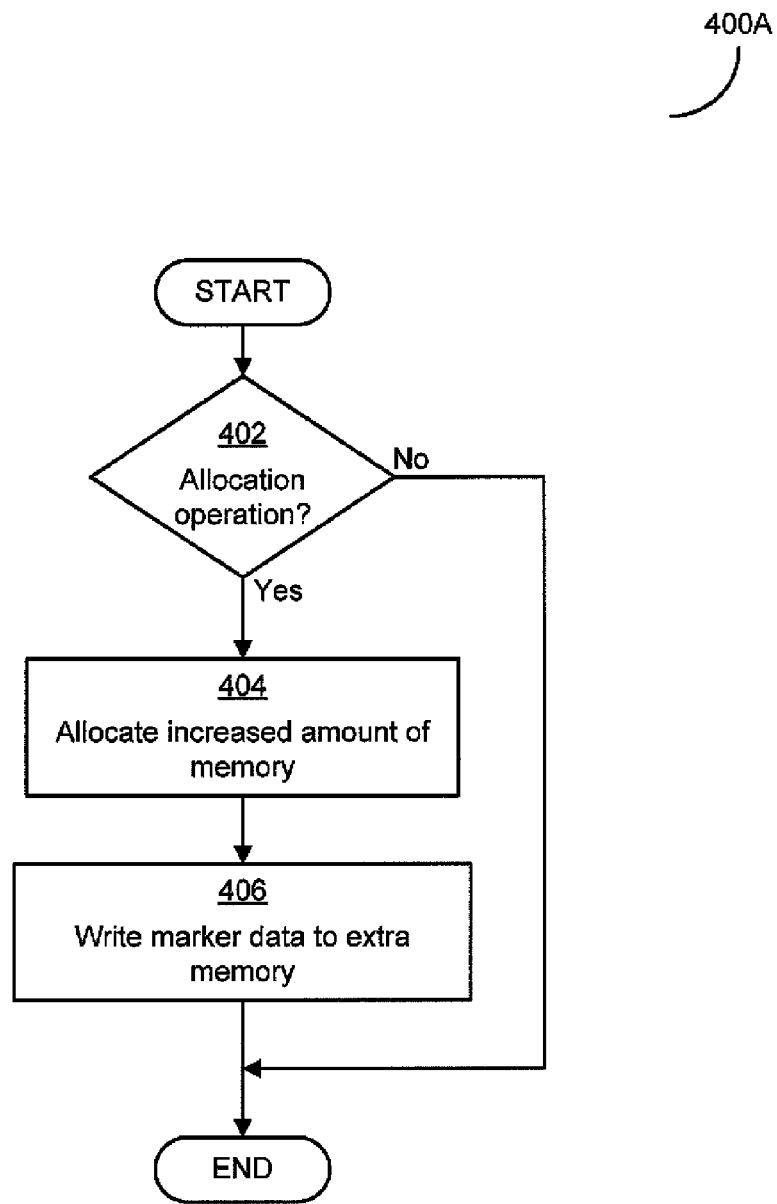
FIGS. 4A, 4B, 4C, and 4D are flowcharts of exemplary techniques for performing memory operations in accordance with one or more of the principles described herein.

The first example of such a mitigation action is shown in process 400A of FIG. 4A. Process 400A begins in block 402, wherein it is determined whether the memory operation requested by a calling software module is an allocation operation; that is, a request that some amount of memory be allocated to the calling software module such that the software module can store an amount of data for a period of time. If not, then the process 400A ends. If, however, the requested memory operation is an allocation operation for an amount of memory, then in block 404 a mitigation action is taken to increase the amount of allocated memory. In some implementations, this larger amount of memory may be dependent on the size of the requested memory; for example, double the requested memory. In another implementation, the extra memory may be a fixed amount of memory for a given computing device; for example, for a 32-bit processor the extra allocated memory may be 32 bytes (i.e., if four bytes were requested, the total allocation would be 36 bytes), and for a 64-bit processor the extra allocated memory may be 48 bytes. Any suitable amount of extra memory may be allocated in block 404.

In block 406, the extra memory is then "marked" as extra memory by storing a marker value in it. The marker value may be any suitable value, and may be a repeated value stored per unit of memory, such as per memory block, or a single value or a pattern of values written across the entire space of extra allocated memory. This marker value may be any suitable value that may be used, as discussed below, as part of an evaluation to determine whether the mitigation action was successful at mitigating a memory error. For example, if the extra memory is reviewed later and it is determined that the marker value has been overwritten, then it may be determined that the software module suffers from a programming bug that caused a buffer overrun error—meaning that a larger amount of data was written than had been requested—and the extra allocation mitigated a memory error by allocating the extra space. After the marker value has been written, then the process 400A ends.

Figure 4B:
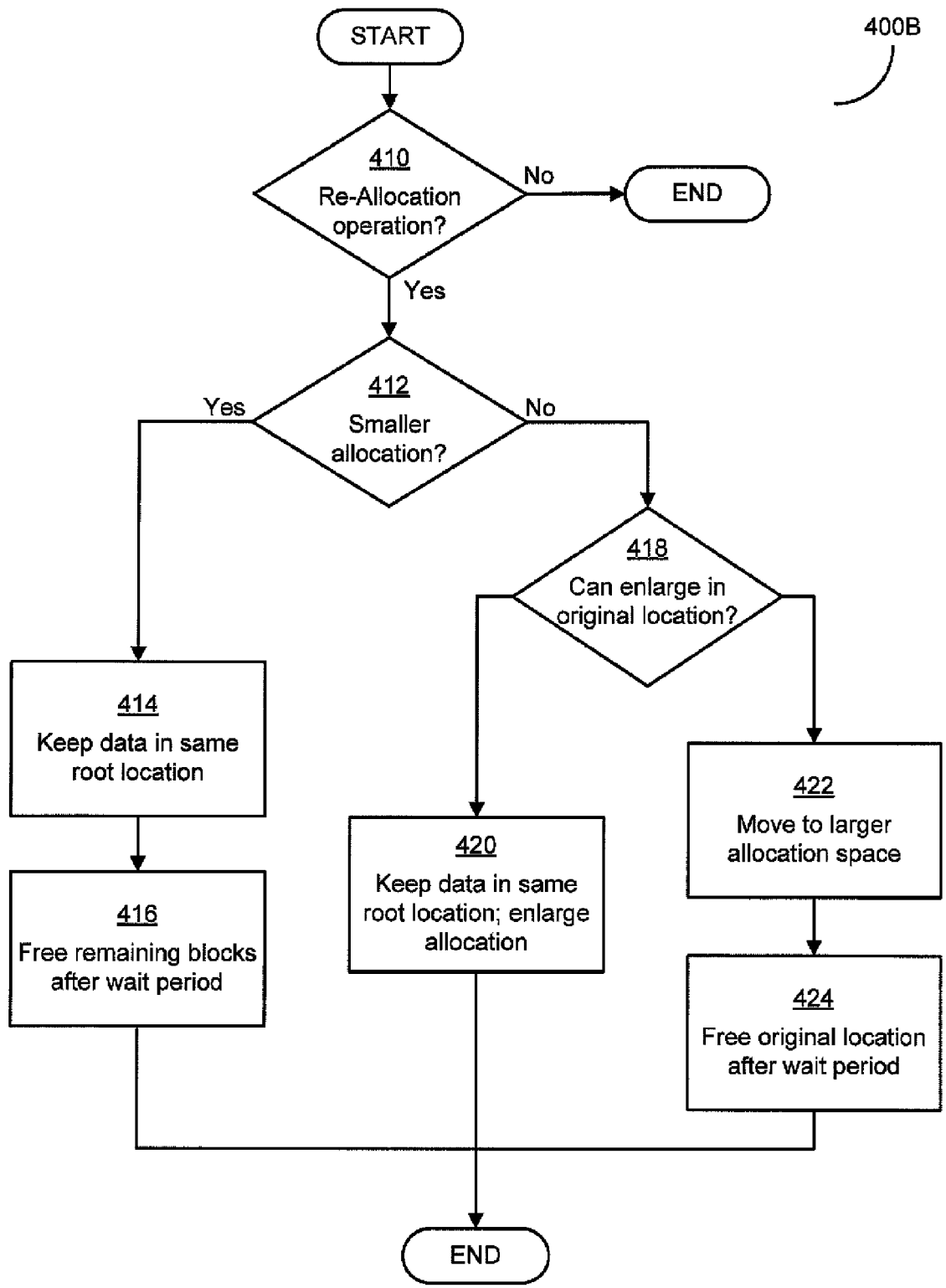

FIG. 4B shows a second exemplary process 400B for carrying out a mitigation action in accordance with some of the principles described herein. The process 400B begins in block 410, wherein it is determined whether the requested memory operation is a re-allocation operation, wherein the calling software module is seeking that an amount of memory previously allocated be increased or decreased. If it is not a re-allocation operation, then the process 400B ends.

If, however, the memory operation is a re-allocation operation, then in block 412 it is determined whether the request is for a reduced memory allocation. If it is, then, in block 414, the allocation is kept in the same root location when the remaining memory from the original allocation is de-allocated. In block 416, the memory management module 110 does not immediately free the remaining memory but rather waits until after a wait period. In block 414, markers as described above may be added to the memory to be freed. When the memory is actually freed, these markers may be checked to ascertain whether the memory, which was intended to be unused, was accessed. The process 400B then ends.

If it is determined in block 412 that the requested re-allocation is for a larger amount of memory, then in block 418 it is determined whether there is enough free memory directly adjacent to the original allocation that the requested new memory can be allocated from the directly adjacent memory and the original location can be kept for the data. If so, in block 420 that is done: the data from the original allocation is kept in the same location, the allocation is enlarged from that location, and the process ends.

If, however, there is not enough memory directly adjacent, then the allocation is moved to a larger space in another part of the memory in block 422, and in block 424 the original memory is not deallocated until after a wait period. As described above, the memory that was previously allocated and should no longer be in use may be filled with markers so that a bug causing access to that memory may be detected. The process mitigation then ends.

This mitigation may be used to mitigate memory errors in software modules suffering from programming bugs that result in the software module continuing to use an original memory space following a re-allocation operation in which the memory allocation was moved to a different part of the memory. By attempting to retain the memory allocation in the same place, and not allowing other software modules to use memory blocks until after a wait period, then the effects of these programming bugs may be mitigated as the software module is able to use the original allocation until the wait period expires.

Figure 4C:
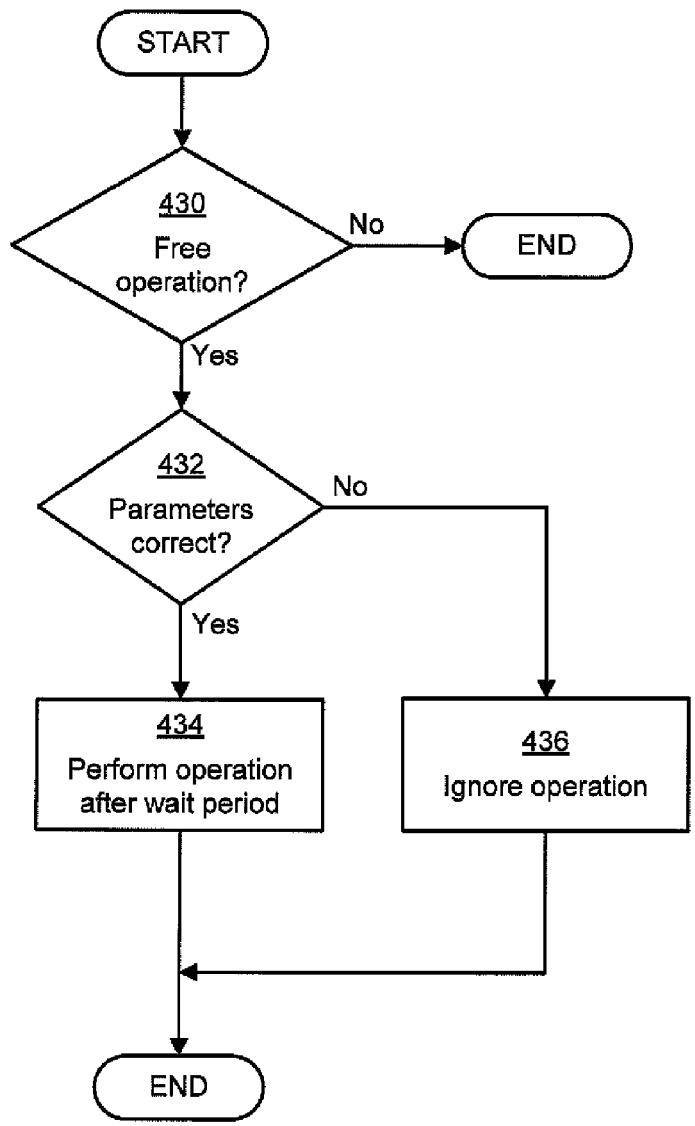

FIG. 4C shows another exemplary process 400C. Process 400C begins in block 430, wherein it is determined whether the requested operation is a de-allocation, or "free," operation. If not, then the process 400C ends.

If, however, the requested memory operation is a free operation, then in block 432 it is determined whether the input parameters of the free operation are correct, For example, if the memory management module 110 is one which manages allocation of heap memory, then it may be determined in block 432 whether the address of the memory requested to be freed is properly allocated heap memory, rather than an address for stack memory or global variable space. This may be done in any suitable manner.

For example, the mitigation module 112 may determine whether the memory referenced by the input address of a "free" operation is heap memory by comparing the address to the address range of the heap; if not, then the input address is likely incorrect. As another example, a memory manager, upon allocating a block of memory in a heap may tag the block with a marker. If the mitigation module 112 was implemented to carry out the process 400A of FIG. 4A, then any properly-allocated heap memory would have stored in the extra memory the marker values. By checking for the existence of these marker values, the mitigation module 112 could determine that the memory had been properly allocated by the memory management module 110, and thus the input parameters are correct. If it is determined, in any way, in block 432 that the parameters are correct, then in block 434 the requested free operation may be performed following a wait period, and the process 400C ends. As described above, in a mitigation mode, "freed" memory may not be immediately made available for use. Rather it may be filled with marker values to enable detection of unintended access to that memory. If, however, the parameters are not correct, then in block 436 the operation may be ignored or an error message may be generated and sent back to the calling software module, and the process ends. In ignoring an operation, an indication may be stored that the mitigation was successful at blocking a bug from creating an error. Such a stored indication may be used, as described below, to determine whether to continue applying a mitigation 400C to a calling software module.

Figure 4D:
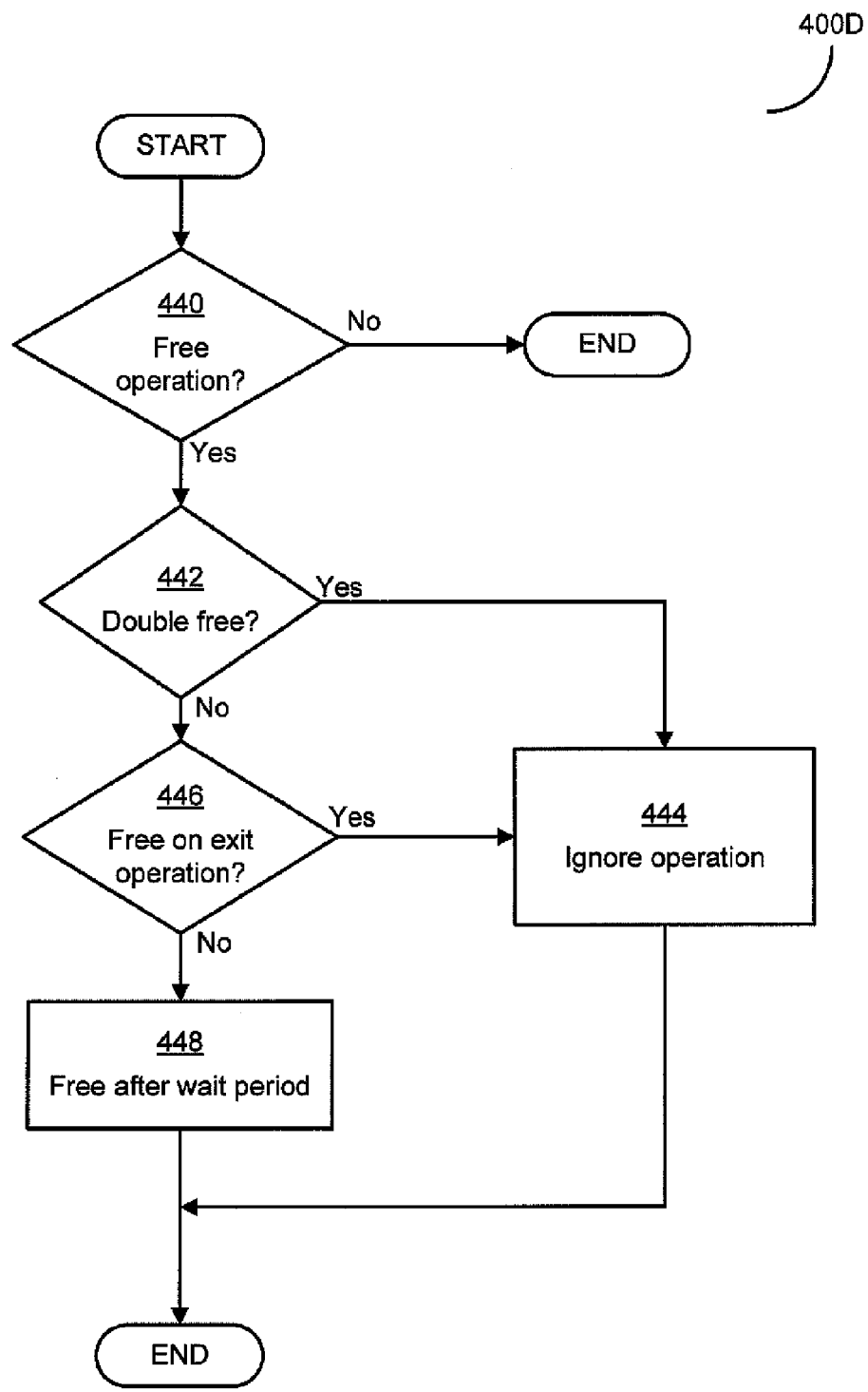

FIG. 4D shows one more example of a process that may be implemented by a mitigation module 112 for carrying out one or more mitigation actions. In process 400D of FIG. 4D, it is determined first in block 440 whether the requested memory operation is a de-allocation, or "free," operation. If not, then the process 400D ends. If, however, the requested memory operation is a free operation, the in block 442 it is determined whether the free operation is a "double free"—that is, it is determined whether the free operation is a duplicate of a previous free operation as a result of a programming bug in the calling software module. This may be done in any suitable manner, including by determining whether the memory requested to be freed has not yet been performed, for example, because it is still in a wait period from the previous request. Memory in this wait period may be identified of contains marker values as described above or by storing a record of "freed" memory blocks or in any other suitable way.

If it is a duplicate, then in block 444 the operation is ignored. If it is not a duplicate, then in block 446 it is determined whether the free operation is associated with an exit of the calling software module, as the calling software attempts to clean up its allocated memory during exit. This may be done in any suitable manner. If so, then in block 444 the requested is ignored and not performed. This may be done for two reasons. First, research has shown that many calling software modules, such as user applications, incorrectly free memory during shutdown, resulting in 30 percent of memory errors experienced during shutdown. Second, many operating systems 108 and memory management modules 110 already have automatic free operations when a calling software modules exits, so the free operation requests made by the calling software module may be considered duplicates. If the operation is ignored in block 444 as a result of a decision in either of blocks 442 or 446, then the process 400D ends.

If, however, the requested memory operation is determined in block 446 not to be a free on exit operation, then in block 448 the free operation is performed following a wait period. This may be done to prevent memory errors that may arise when a calling software module, as a result of a programming bug, frees memory and then still uses the memory following the free. By not performing the free operation until after a wait period, then the effects of a memory error that may result from the memory being immediately re-allocated to another software module following the free, in which the original software module and the new software module may then both use the memory and each overwrite the data saved by the other, can be mitigated. Once the memory operation is performed after the wait period, then the process 400D ends.

Performing a free operation after a wait period may be done in any suitable manner. For example, the wait period may be a set period of time, such as a few seconds. The wait period may also be a flexible period of time, such as based on the number of allocation and free operations being requested, such as longer when there is a lower demand for memory and shorter when there is a higher demand for memory. Another possible implementation is waiting until after the application terminates such that the memory is actually freed by parts of an operating system that deallocates memory used within a process when the process terminates. In this way, an application terminates and the process within which that application executes also terminates, the memory may ultimately be freed. In other implementations, the wait period may not be a set period of time at all, but rather be an unpredetermined period of time resulting from placing the free operation into a queue to be executed when it reaches the top of the queue. One example of such an implementation is shown in FIG. 5, but it should be appreciated that others are possible.

Figure 5:
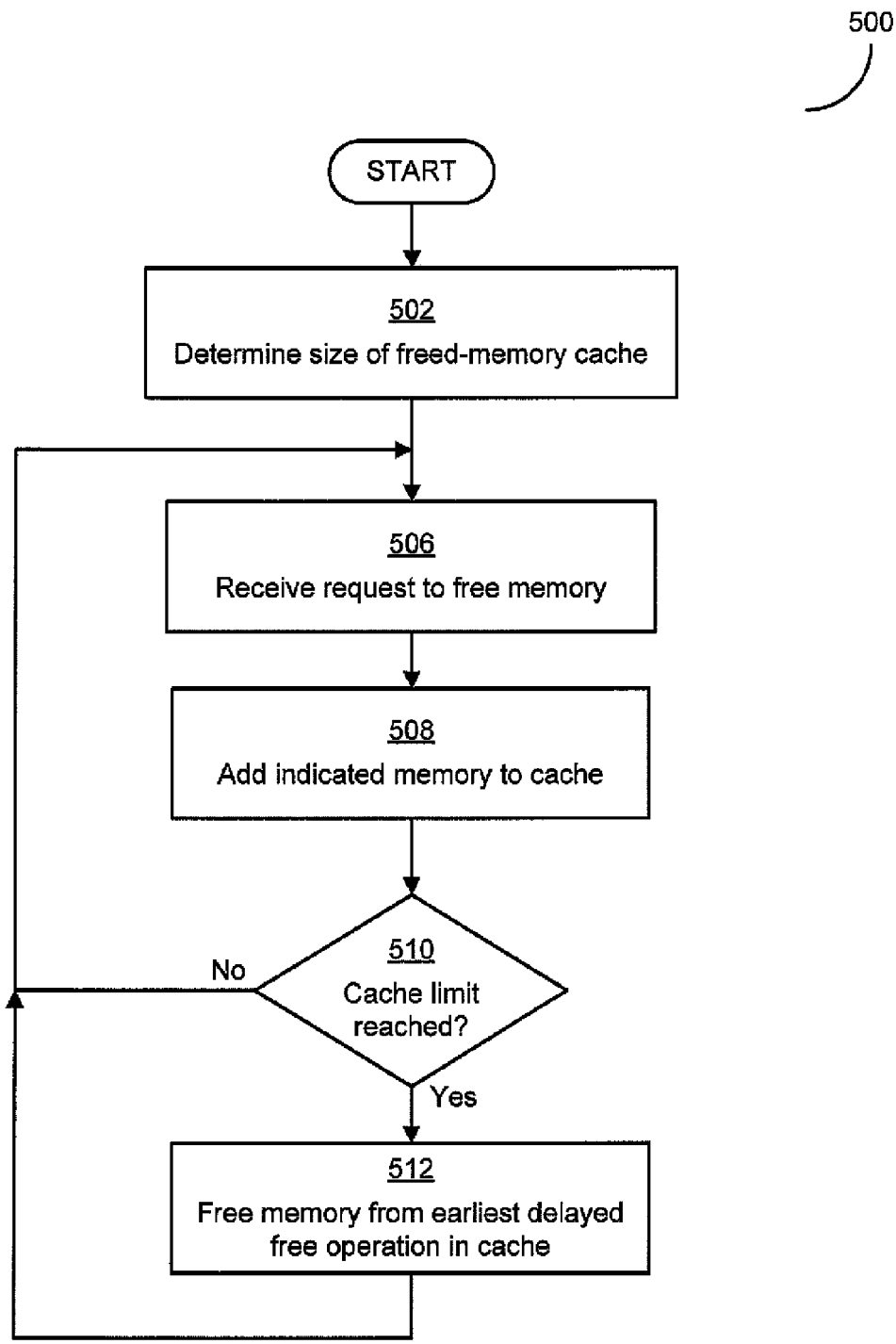
FIG. 5 is a flowchart of one exemplary technique for performing an operation to deallocate memory in accordance with some of the principles described herein.

The process 500 of FIG. 5 begins in block 502, wherein a size of a freed-memory cache is determined. This may be determined in any suitable manner, such as by selecting a percentage of a total memory space, or by accepting input from a user or administrator of a computing device. For example, the freed-memory cache may be eight megabytes (8 MB). In block 506, the mitigation module 112 receives a request to perform a free operation. In block 508, the memory requested to be freed is added to the cache, meaning that the amount of memory in the free operation is added to the cache total. When the memory is added to the cache, an indication of the operation to be performed is also added to a process queue, indicating that the operation was requested. It should be appreciated that the memory is maintained as allocated to the calling software module while the memory is in the "cache," because in this implementation the cache is maintained as an indicator of an amount of memory requested to be freed and not yet freed.

In block 510, following the addition of the memory to the cache, it is determined whether the amount of as-yet-unfreed memory has reached or exceeded the size of the cache. If not, then process 500 returns to block 506, whereupon it receives another instruction to free memory. If the cache limit has been reached or exceeded, then in block 512 at least the operation at the top of the queue is popped off and executed, freeing the memory associated with that earliest delayed free operation and reducing the size of memory allocated to the cache to below the limit. It should be appreciated that, in some circumstances, to again return the size of the cache to below the limit may require executing two or more operations from the queue, but that the principle is the same as shown in FIG. 5. Once the first operation in the queue is executed and removed from the queue, then the flow of process 500 returns to block 506, whereupon another instruction to perform a free operation is received.

The foregoing describes several exemplary implementations of a memory management module 110 having a mitigation mode in which a mitigation module 112 uses one or more mitigation actions to reduce the likelihood of memory errors negatively impacting software modules. As described below, these mitigations may be selectively applied on an application-by-application basis based on whether mitigation is likely to reduce an error in each application. Exemplary implementations of a mitigation enablement module 114 for selectively enabling the mitigation mode and for evaluating the effectiveness of the mitigation actions may be described. It should be appreciated, however, that a mitigation enablement module 114 may be implemented in any suitable manner, including as a component of the mitigation module 112, as embodiments of the invention are not limited in this respect.

Figure 6:
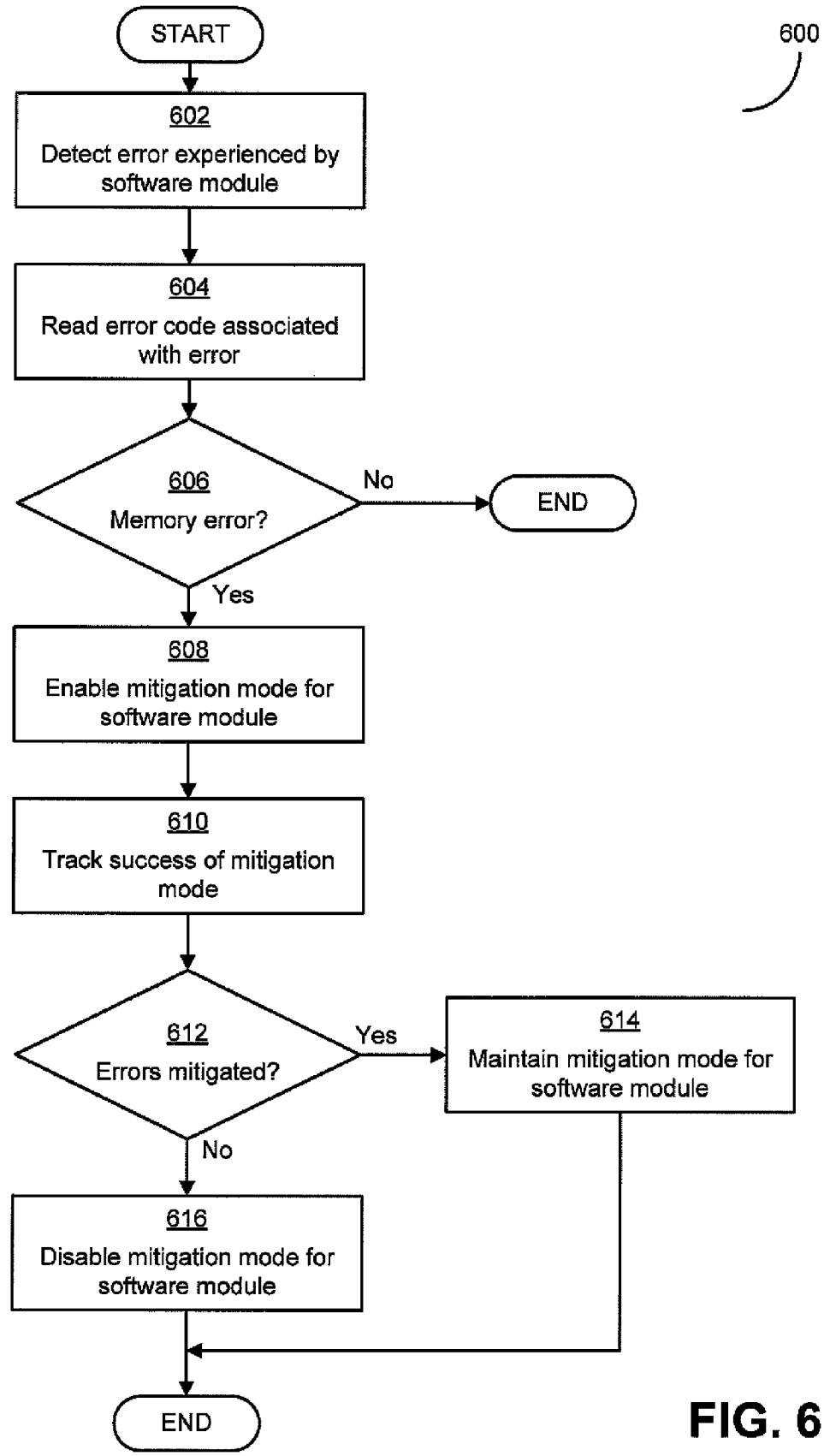
FIG. 6 is a flowchart of an exemplary technique for determining whether to apply mitigation techniques for a particular application in accordance with some of the principles described herein.

FIG. 6 shows one such exemplary implementation in accordance with the principles described herein. Process 600 of FIG. 6 begins in block 602, wherein the mitigation enablement module 114 detects that an error was experienced by a calling software module. This detection may be performed in any suitable manner, such as by detecting that the software module crashed or otherwise executed improperly. In block 604, the error code associated with the error is read, and in block 606 it is determined whether it was a memory error. If it was not a memory error, then the process 600 ends.

If, however, it was a memory error, then process 600 continues to block 608 at which mitigation mode is enabled for the particular calling software module, such as by creating or editing an entry to the rules and settings records 218 in data store 212 and the information regarding the error event is written to the event log 216. In some implementations, mitigation mode may be enabled when a memory error is first detected, while in alternative implementations a threshold number of memory errors or a threshold number within a certain time frame, such as four within one hour, must be reached before mitigation mode is applied. Any suitable test for initiating mitigation mode may be implemented in accordance with the principles described herein.

In block 610, the mitigation enablement module 114 tracks success of the mitigation actions over time, as operations are requested by the software module and performed by the mitigation module 114 of the memory management module.

Tracking the success may be done in any suitable manner, including by any of the techniques described herein. In some implementations, this may comprise compiling statistics on detected errors experienced by a software module and/or detected successes of mitigation actions in preventing a memory error from negatively impacting a software module. These statistics may be compiled for a particular instance of a software module related to an application, or may be collected over time across multiple instances of a software module. In some implementations, the statistics may include a mitigation ticket value or other mechanism that can track both successes and instances in which the application executed with no successful mitigations. As a specific example, the mitigation ticket value may be incremented in the event that mitigation actions were detected as successful and decremented when an application terminates with no successful mitigations. Termination with no successful mitigations may be determined only upon a "clean" exit from the application. Though, other metrics for no successful mitigation may be applied, such as if either an error or crash is detected as having impacted a software module or where there were no successful mitigations for a particular instance of the application.

In block 612, information collected during the tracking of block 610 is used to determine whether the mitigation actions were successful at mitigating errors. In implementations using statistics such as mitigation ticket values, this may comprise determining whether the statistics indicate that successes are above a particular threshold level or errors are below a particular threshold level—such as by determining whether the mitigation ticket value is above a particular threshold value—but this may be done in any suitable manner. If the mitigation actions were successful at mitigating errors, then in block 614 mitigation mode is maintained for the software module, but if the mitigation actions were not successful, then mitigation mode is disabled for the software module in block 616. Following blocks 614 or 616, the process 600 ends.

It should be appreciated that process 600 of FIG. 6 is merely exemplary of the types of techniques that may be implemented by a mitigation enablement module 114 in accordance with the principles described herein, and that others are possible. For example, while detecting errors and evaluating error codes is described in FIG. 6 as a responsibility of the mitigation enablement module 114, in some alternative implementations these functions may be performed by another module of an operating system 108, such as the Windows Diagnostic Infrastructure (WDI) module of the Microsoft Windows operating system, and the mitigation enablement module 114 may monitor the WDI module to determine when a memory error is detected or be notified by the WDI module when a memory error is detected.

Further, mitigation mode is described as being enabled or disabled based on a determination, in block 612, of whether the mitigation actions have been successful at mitigating errors. In some implementations, the mitigation enablement module 114 may additionally or alternatively enable/disable mitigation mode based on other factors such as time or a number of software modules whose memory operations are being performed in mitigation mode. For example, in one implementation, operations of a software module may only be performed in a mitigation mode for a period of time, such as one week, before reverting to normal (non-mitigated) mode.

In another exemplary implementation, the mitigation enablement module 114 may only enable mitigation mode for a set number of software applications in a given time, such as only four at the same time, to conserve system resources. If the maximum is reached and it is detected, such as in blocks 602-606, that mitigation mode should be enabled for another software module, then software module that had mitigation mode enabled the earliest may have it disabled such that the new software module may have it enabled.

In some implementations, a combination of each of these techniques may be used, such that a mitigation mode is left enabled for a software module for a set period of time as long as the mitigation enablement module 114 detects that the mitigation actions are successful at mitigating errors, but the mode is only enabled for a set period of time after which it is disabled when it is next detected that another software module could benefit from the mitigation mode.

Figure 7A:
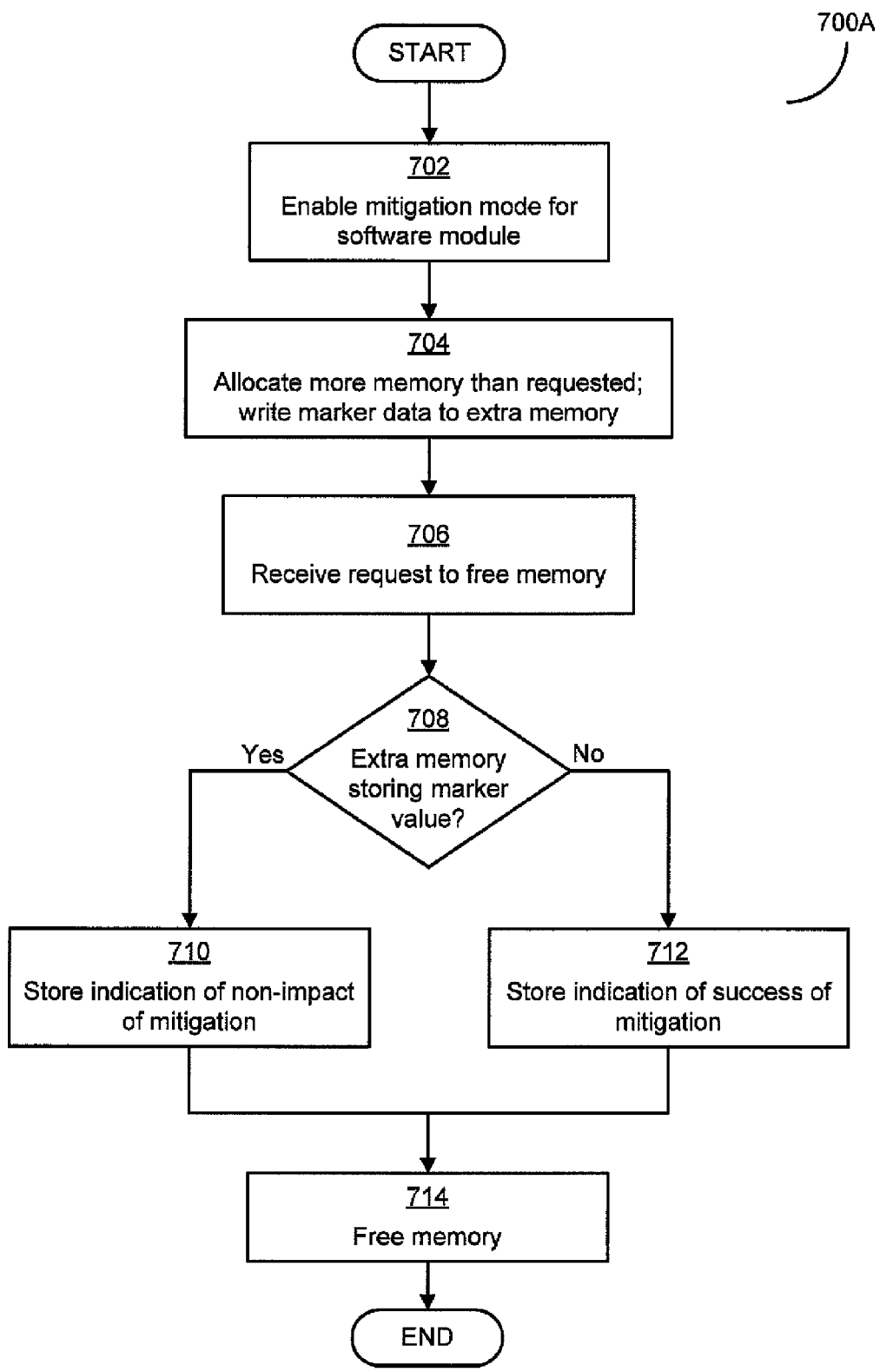
FIGS. 7A and 7B are flowcharts of exemplary techniques for determining the success of mitigation techniques in mitigating the effects memory errors have on applications in accordance with some of the principles described herein.
Figure 7B:
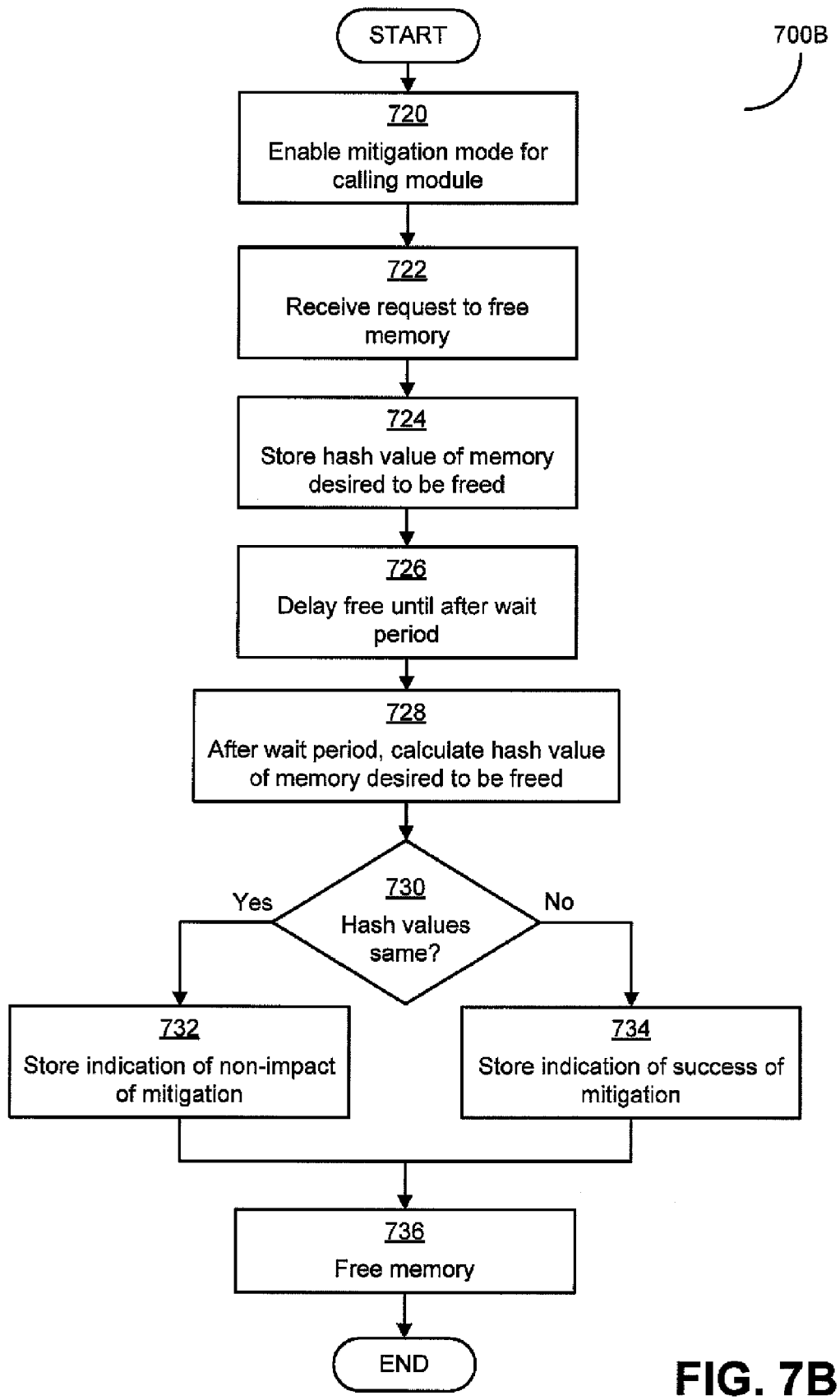

Tracking the success of mitigation actions at reducing a number of memory errors experienced by an application may be performed in any suitable manner. FIGS. 7A and 7B show flowcharts for two exemplary techniques for detecting the success of mitigation actions, though it should be appreciated that others are possible depending on the types of memory errors desired to be mitigated and the types of mitigation actions available to a mitigation module 112.

Process 700A of FIG. 7A is one example of an overall process for how the success of a mitigation action at mitigating errors could be tracked. In this example, the allocation process 400A of FIG. 4A is the mitigation action being tracked. Process 700A begins in block 702, wherein the mitigation enablement module 114 enables mitigation mode for a software module for any reason. In block 704, a request is received by the mitigation module 112 for performing an allocation operation for the particular software module and, in accordance with process 400A of FIG. 4A, more memory is allocated than requested and the marker value is written to the extra memory.

In block 706, the mitigation module 112 receives a request to perform a free operation on the memory allocated in block 704. As described above, this free operation may be delayed. But, when it is implemented at block 708, it is determined whether the extra memory allocated in block 704 is still storing the marker value written to it. If the extra memory is still storing the marker value, then in block 710 the mitigation enablement module 114 may store an indication of the non-impact of the mitigation action on memory errors in that instance, such as in its event log 216. If it is determined in block 708 that the extra memory is not storing the marker value, however, then in block 712 the mitigation enablement module 114 may store in the event log 216 an indication of success at mitigating an error. In this case, it is successfully detected that the software module wrote more data than it had requested space for, and thus a buffer overrun error was successfully mitigated by the mitigation module 112. Following storing either indication in blocks 710 or 712, the memory is freed in block 714, which may be done in any way, including in accordance with the delayed free process 500 described in connection with FIG. 5. After the memory is freed in block 714, the process ends.

FIG. 7B shows another exemplary technique 700B for tracking the success of the mitigation module in mitigating errors, this time in accordance with a delayed free mitigation action such as the process 500 of FIG. 5. As with process 700A, the process 700B begins in block 720, wherein mitigation mode is enabled by the mitigation enablement module 114 for a particular software module for any reason. In block 722, the mitigation module 112 receives a request to perform a free operation for memory that had been previously allocated to the particular software module. In block 724, a checksum or hash value is calculated in any suitable manner for the contents of the memory desired to be freed, and in block 726 execution of the free operation is delayed until after a wait period. In block 728, following the wait period, the checksum or hash value is again calculated for the contents of the memory. In block 730, it is determined whether the original hash value from block 724 matches the later hash value of block 728. If so, then in block 732 the mitigation enablement module 114 may store in its event log 216 that the mitigation action did not have an impact on mitigating errors in that instance. If, however, the hash values are determined in block 730 to not be the same, then in block 734 an indication of a success of the mitigation module 112 at mitigating an error may be stored in the event log 216 of the mitigation enablement module 114, as it could be detected that because the contents of the memory changed over time, delaying the free until after the wait period mitigated the effects of a memory error that may have resulted from a programming bug freeing the memory before the software module was done using it. Following storing either indication in blocks 732 or 734, the memory is freed in block 736 and the process ends.

The indications of effectiveness and non-effectiveness of the mitigation actions that are stored by processes 700A and 700B may be used in any suitable manner. In some implementations, these indications may be used to calculate statistics on the impact mitigation actions are having on software modules related to an application. These statistics may be calculated across multiple instances of a software application. Such statistics may include a time component to allow a successful mitigation frequency to be computed. In some embodiments, the time component may be an indication of a time over which numbers of successful mitigations are observed. Though, the time component could also be measured as a number of invocations of the calling software module. The successful mitigation frequency may be a predictor of whether retaining a mitigation is likely to avoid impacts of a bug on a calling software module, and it may be determined based on these statistics whether to implement mitigation actions for future instances of the calling software module.

Figure 8:
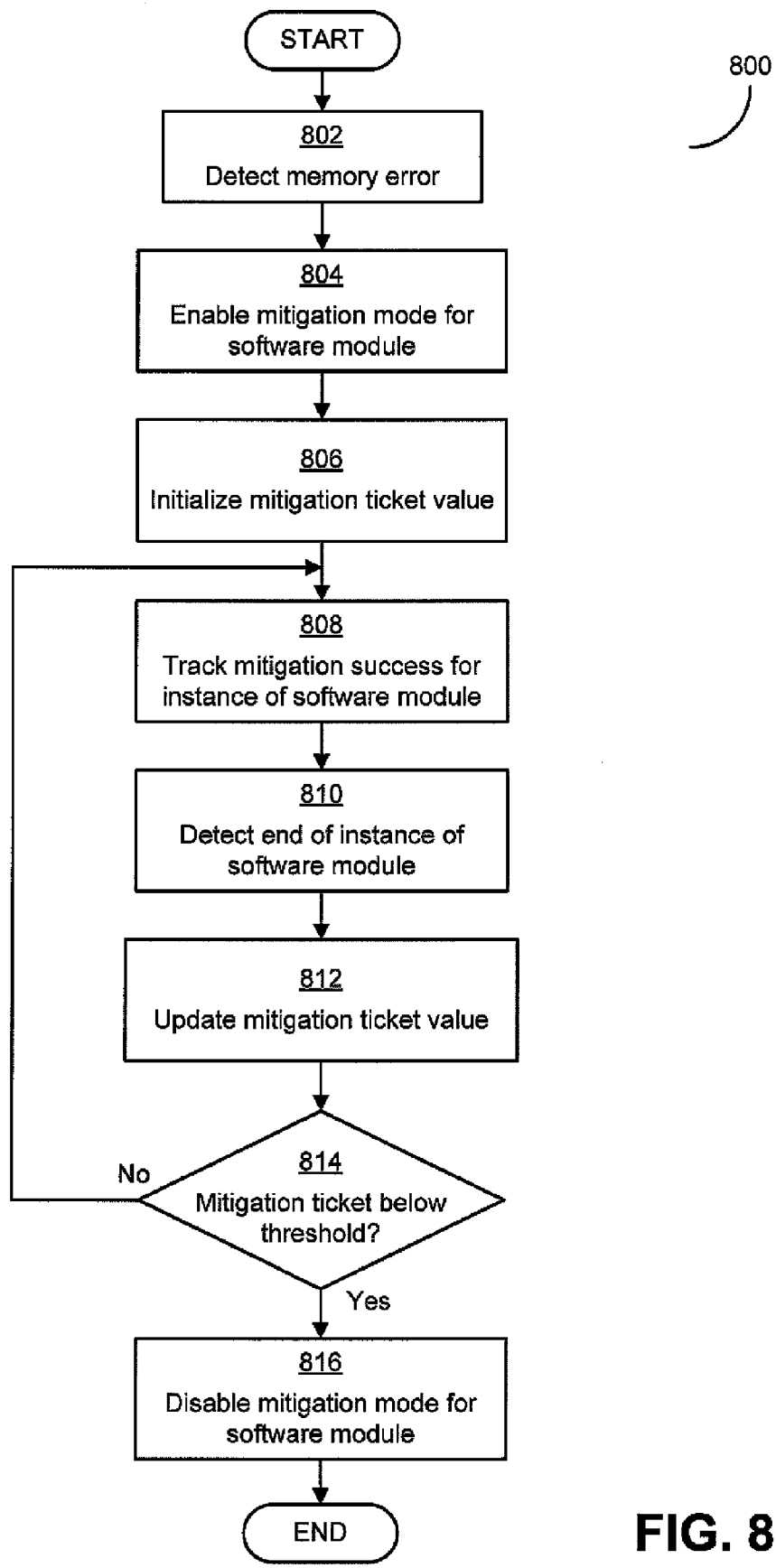
FIG. 8 is a flowchart of an exemplary technique for determining whether to remove mitigation techniques for a particular application in accordance with some of the principles described herein.

As discussed above, in one implementation mitigation ticket values, such as those shown in FIG. 2C, may be used as the statistics to determine whether a mitigation mode should be enabled for a particular software module. This mitigation ticket value may be any suitable value, and may be initialized and adjusted in any suitable manner. FIG. 8 shows one example of a technique that may be used for managing a mitigation mode using a mitigation ticket value for each calling software module. In the embodiment illustrated, ticket values are stored in non-volatile memory and can persist across instances of applications, shutdowns of a computer or other events.

The process 800 of FIG. 8 begins in block 802, wherein a memory error is detected by the mitigation enablement module 114. Detection in block 802 may be done in any suitable manner, including by detecting improper execution or a crash of the software module. In block 804, mitigation mode is enabled for the software module and in block 806, the mitigation ticket value is initialized to a particular value. The particular value may be any suitable value, and may be a consistent value across all software modules on a particular system, a value selected for a particular group of applications based on any suitable characteristic(s), such as function or source developer, a value selected for the particular software module, or any other suitable value. In some embodiments, as described below, the initial value may be based on historical data on success in mitigating errors for the application in question. In one exemplary implementation, a mitigation ticket value may be an integer, and when mitigation mode is enabled for a software module, the initialized value may be seven (7).

In block 808, the mitigation module 112 performs memory operations for the software module in mitigation mode, and, for each instantiation of the software module—such as each execution of the modulo—the mitigation enablement module 114 tracks the success of the mitigation module 112 at mitigation errors in that instantiation. Tracking the success may be done in any suitable manner, including by any of the techniques described above in connection with FIGS. 7A and 7B.

In block 810, the mitigation enablement module 114 detects an end of the instance of the software module. The end of the instance may have been a proper end, such as one resulting from a user-driven or process-driven exit, or may have been an improper end, such as from a crash. In block 810, information on the end of the instance of the software module and the cause of the end may be stored in the event log 216 of the mitigation data store 212.

In block 812, the information collected in block 808 and 810 is used by the mitigation enablement module 814 to update the mitigation ticket value for the software module. In some implementations, if it was detected that the mitigation module 112 was successful at mitigating errors, then the mitigation ticket value may be incremented. If the mitigation module 112 was unsuccessful at mitigating errors, the mitigation ticket value may be decremented. In other implementations, more factors may be used. Table I shows one example of factors that may be used to determine how to adjust a mitigation ticket value, though others are possible.

TABLE I

|  |  | Mitigations? | |
|---|---|---|---|
|  |  | None | Some |
| End type? | Crash | −1 | −1 |
|  | Clean | −1 | +1 |

In the example of Table I, information is used both on the type of end of the instance of the software module and on the success of the mitigation actions to determine how to adjust the mitigation ticket value for the software module. In Table I, if the mitigation enablement module 114 determines that the instance ended with an improper execution such as a crash, then regardless of whether there were any successful mitigations then the mitigation ticket value may be decremented. This may be done because it is clear that the mitigation actions of the mitigation mode did not do enough to stop a crash, and the losses in efficiency from operating the memory management module 110 in mitigation mode may be assumed to outweigh the benefits of the mitigation mode if there is still crashing. Though other possible reactions to a crash are possible, such as making no change to the ticket value.

If, however, the mitigation enablement module 114 detects that the instance ended with proper execution, resulting in a clean exit, then the determination of whether there were any successful mitigations is more important. In the implementation of Table I, if the instance ended cleanly and there were no successful mitigations detected, then the mitigation ticket value may be decremented. This may be done because if the instance is operating correctly without the mitigation actions having any noticeable impact, then the losses in efficiency are not being outweighed by any detected benefits. If, however, the instance ended cleanly and there were some detected successful mitigations, then the mitigation ticket value may be incremented, as it may be assumed that the successful mitigations are at least partially responsible for the instance operating properly.

It should be appreciated that while in the example of Table I, in each case the mitigation ticket value is incremented or decremented by one only, in other implementations any suitable values may be used for each of the cases, including unequal values for each case. Also, there may be an upper limit set on a ticket value.

Once the mitigation ticket value has been updated in block 812, using any suitable technique, in block 814 it is determined whether the mitigation ticket value for the software module is below a threshold level. For example, in the case where the mitigation ticket value is an integer, it may be determined whether the mitigation ticket value is at or below zero (0). If the mitigation ticket value is not below the threshold, then the process 800 continues to tracking the success of the mitigation actions in the next instance of the software module. If, however, it is determined that the mitigation ticket value is below the threshold level, then mitigation mode may be disabled for future instances of the software module, and the process 800 ends.

In implementations of the principles described herein that use mitigation ticket values, the values may be adjusted at any suitable time, and not only following execution of an instance of a software module. For example, in one implementation, as described above, a mitigation mode may be enabled for a software module for a period of time, such as one week, after which the mitigation mode is removed. Accordingly, in implementations that use mitigation ticket values, after the time period the mitigation ticket value may be reset to null, reduced to zero, or otherwise cleared. In some implementations, sometimes in addition to the time period, only a certain number of software modules are allowed to be operated in a mitigation mode at a particular time, and if another software module is placed into mitigation mode the mitigation ticket value of the first software module may be cleared. Also, to avoid arbitrarily increasing the size of a data structure as shown in FIG. 2C, information on an application may be entirely deleted after some period of time.

Figure 11:
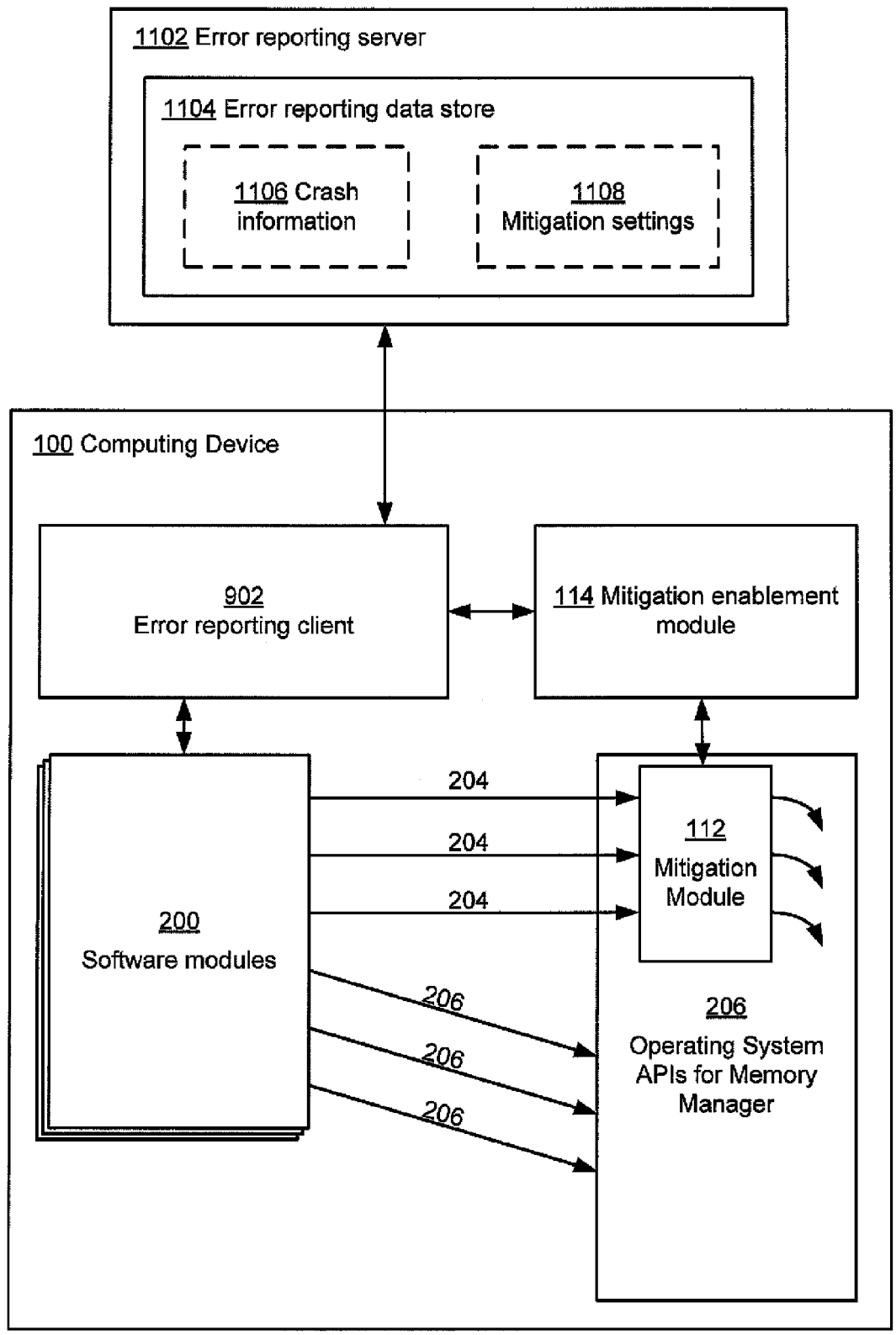
FIG. 11 illustrates an exemplary computer system in which techniques operating according to some of the principles described herein may act.
Figure 12:
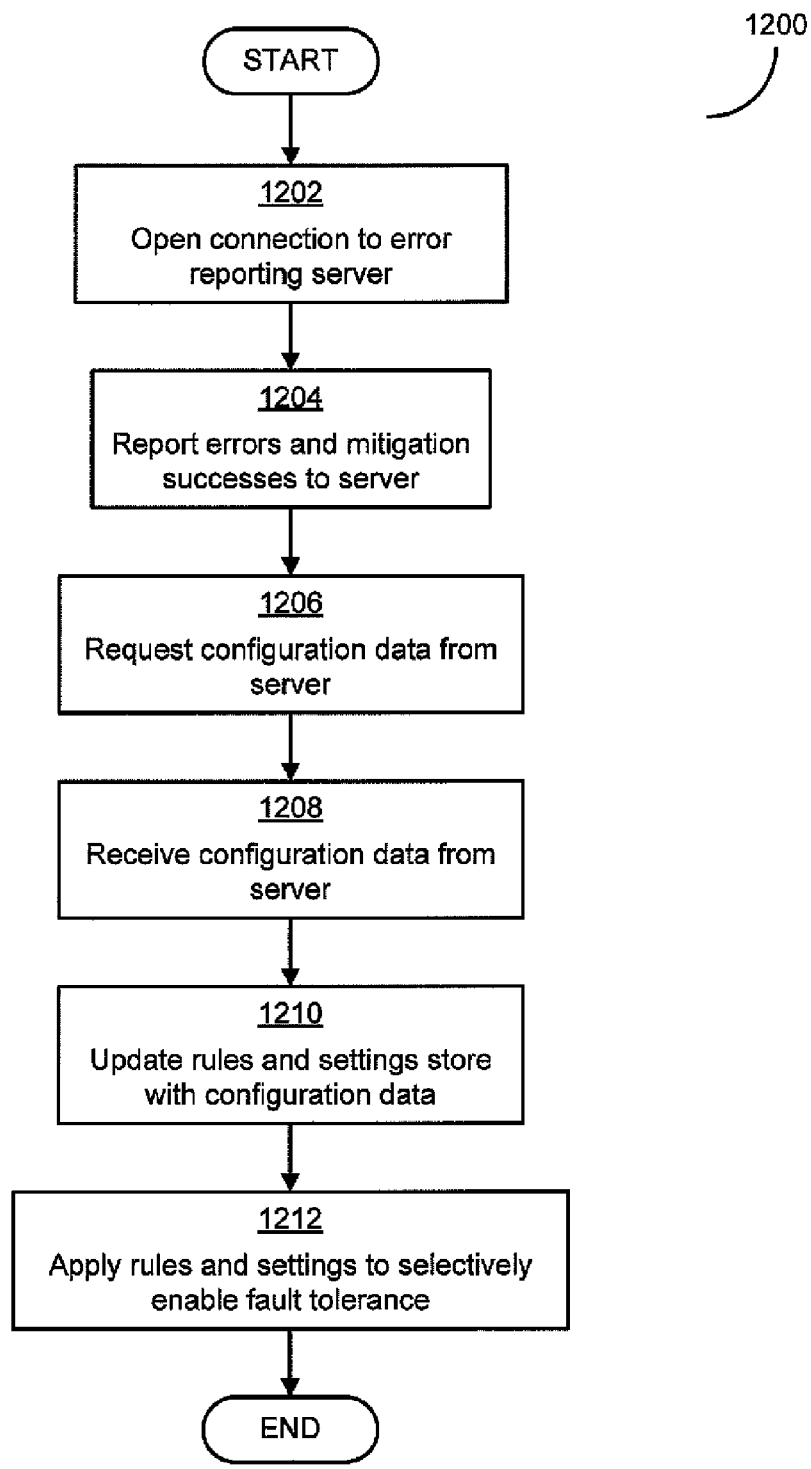
FIG. 12 is a flowchart of an exemplary technique for configuring a computing device to use memory management techniques in accordance with some of the principles described herein.
Figure 13:
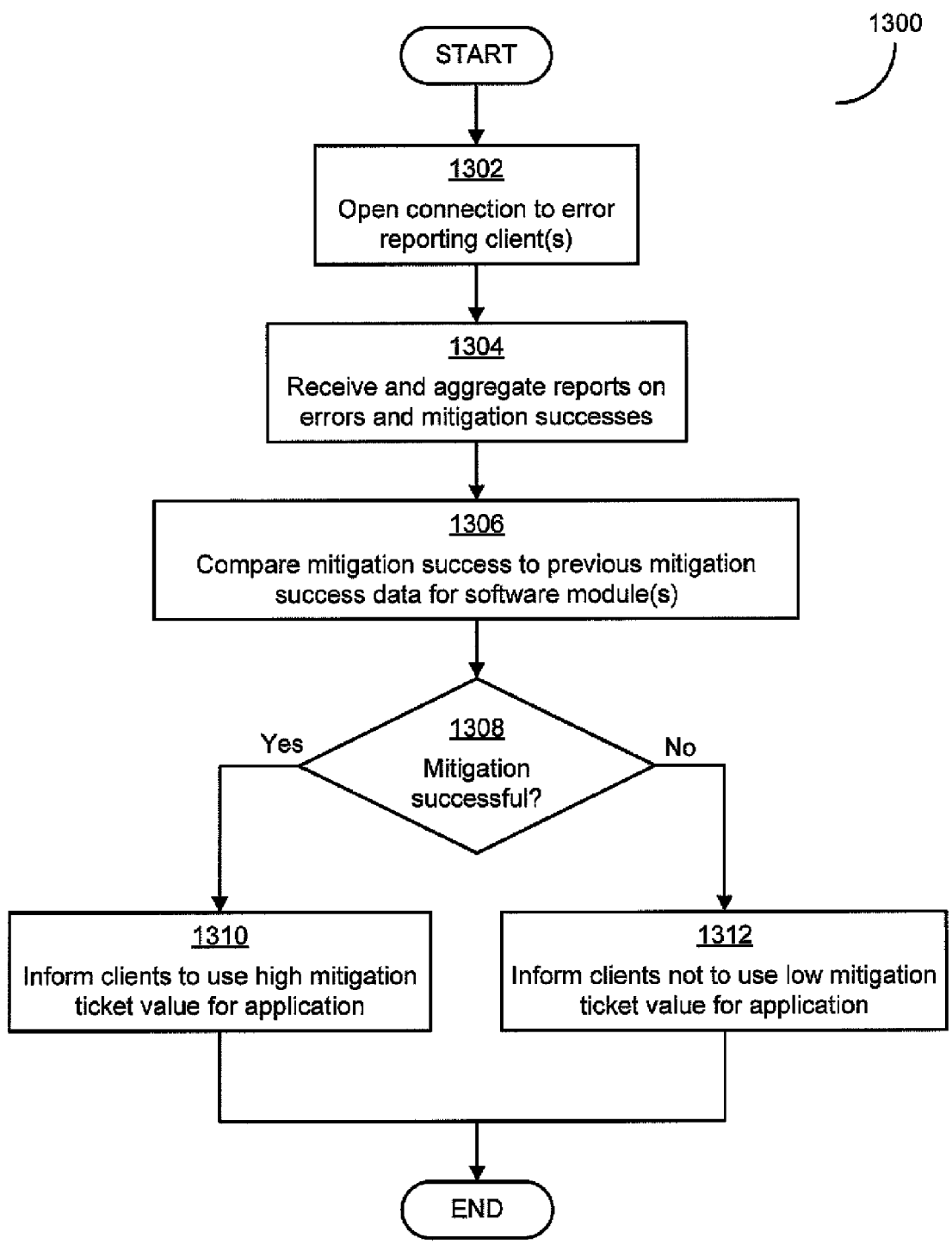
FIG. 13 is a flowchart of an exemplary technique for receiving error and mitigation data at a central aggregation server adapted to configure computing devices to use memory management techniques in accordance with some of the principles described herein.

The initialization values for a mitigation ticket value used in the process 800 may be received from any suitable source, including from a user and/or administrator of the computing device 100. In some implementations operating in accordance with some of the principles described herein, the source of the initialization values may be a remote computing device, such as an aggregation server collecting information from a plurality of computing devices on successes of mitigation actions in mitigating errors of particular software modules. Such an implementation is illustrated in FIGS. 9-11, and techniques operating in accordance with this embodiment are shown in FIGS. 12-13.

Figure 9:
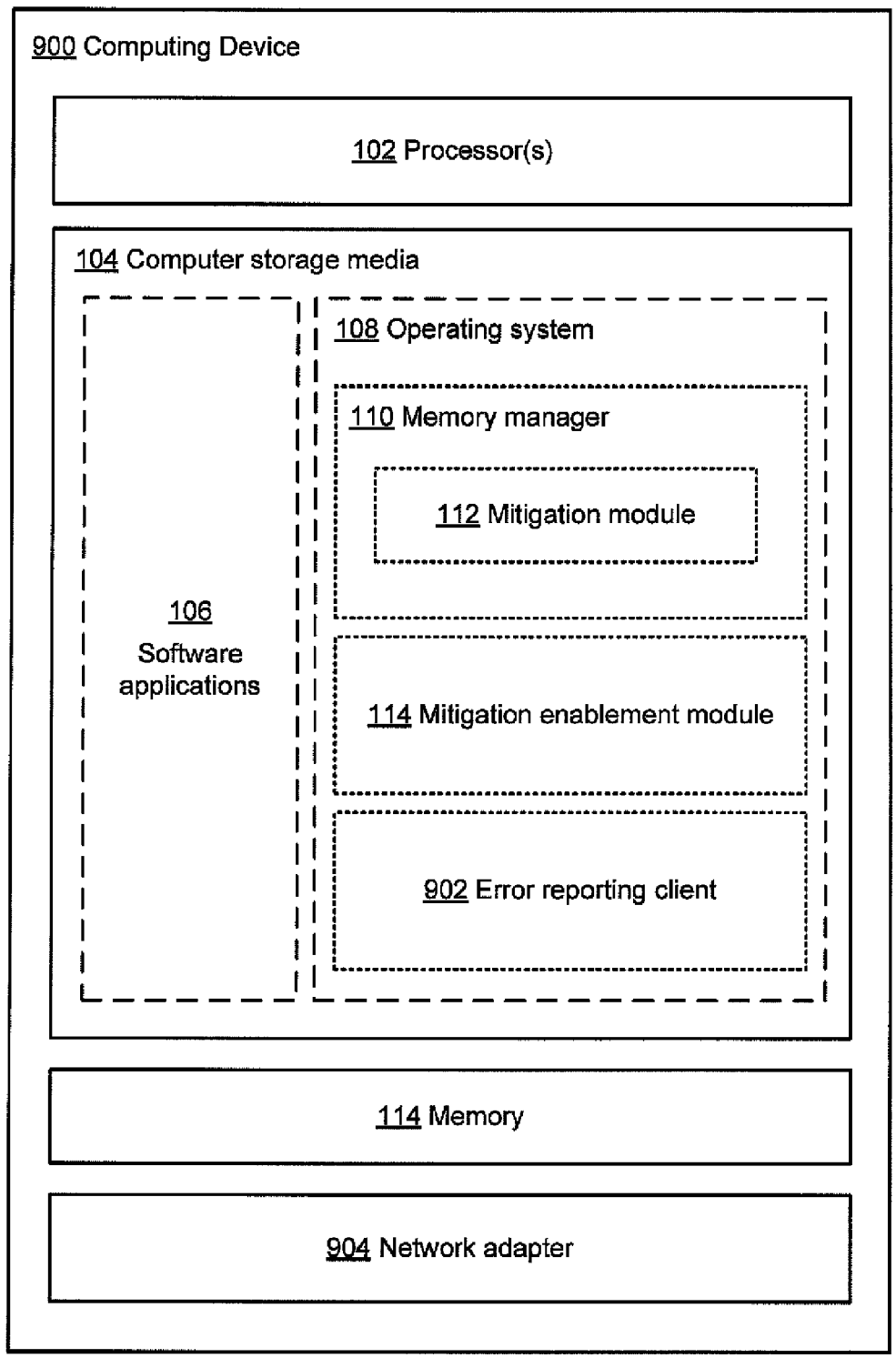
FIG. 9 is a block diagram of an exemplary computing device in which techniques operating according to some of the principles described herein may act.

FIG. 9 shows an implementation of a computing device 900 in accordance with this implementation. As discussed above with FIG. 1, the diagram of computing device 900 is not intended to be a comprehensive depiction of components of a computing device 900, nor is it intended as a depiction of components necessary for operating a computing device in accordance with this implementation. The computing device 900 of FIG. 9 shares some common components with the computing device 100 of FIG. 1 discussed above, and thus, for simplicity, these common components have been designated with the same reference characters and will not be discussed farther here. Further, it should be appreciated that the computing device 900 may be implemented as any of the suitable computing devices described above, including as a desktop or laptop personal computer.

In addition to the common components, computing device 100 of FIG. 9 includes an error reporting client 902 as a component of operating system 108, as well as a network adapter 904. Network adapter 904 may be any suitable hardware and/or software to enable the computing device 900 to communicate with any other suitable computing device over any suitable computing network. The computing network may be any suitable wired and/or wireless communication medium or media for exchanging data between two or more computers, including the Internet. In some implementations, network adapter 904 may be implemented as two or more separate network adapters, offering connectivity via two or more types of network interfaces (e.g., a wired network adapter such as an Ethernet adapter and a wireless network adapter such as an IEEE 802.11g adapter). Error reporting client 902 may be any suitable functional module for collecting information regarding software modules executing on the computing device 900, as well as any errors experienced by the software modules and any successful mitigation actions taken by the mitigation module 112. The error reporting client 902 may transmit this information, using the network adapter 904, to any suitable destination, including an aggregation server.

Figure 10:
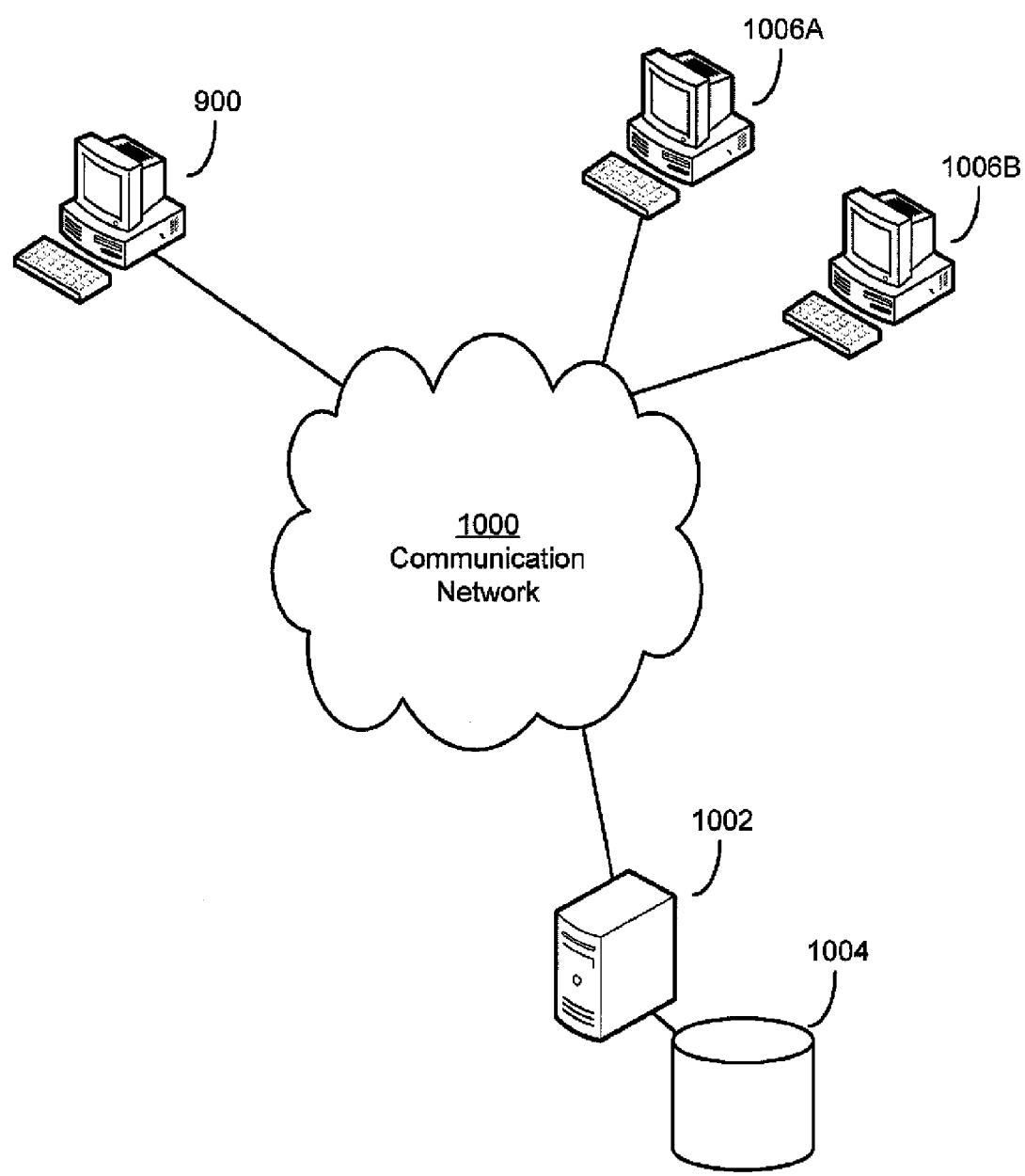
FIG. 10 is a schematic of some of the interactions between some of the components of one exemplary system in which techniques operating according to some of the principles described herein may act.

FIG. 10 shows one example of a computer system in which the computing device 900 may act. FIG. 10 shows a computer system comprising a communication network 1000 to which computing device 900 may connect. Communication network 1000 may be any suitable wired and/or wireless network, including a portion of a larger wired and/or wireless network, such as a home network, a subnet of an enterprise network, the Internet, and/or others. Further, as discussed above, computing device 900 is shown as a desktop personal computer, but may be any suitable computing device. Accessible to the computing device 900, over the communication network 1100, is a server 1102. The aggregation server may be implemented as any suitable server device configured to collect any suitable information, including as an error reporting server acting as a central repository of data relating to software modules executed on a plurality of computing devices including computing device 900 and computing devices 1006A and 1006B. The data stored by the error reporting server 1102 may be stored in any suitable manner, including on an associated data store 1104. As discussed in further detail below, the error reporting server 1002 may be adapted to aggregate information transmitted by error reporting clients of the plurality of computing devices, evaluate the information, and provide configuration information to the computing devices. In this manner, the computing device 900 may be configured based on the experiences of other computing devices 1006A and 1006B, and vice versa. The configuration information provided by the error reporting server 1002 may be any suitable information, including configuration statistics by which the success of mitigation actions should be measured across multiple instances of an application. As with statistics collected locally, the success information may be combined with a time component to yield a frequency of successful mitigations that can be used to predict future successes. Such information may be used to derive values indicating whether and for how long mitigations should be applied. For example, the configuration statistics may include indications of how many instances should be considered prior to determining that mitigation mode should be disabled. In some implementations the configuration statistics may include mitigation ticket initialization values for particular applications.

FIG. 11 is a diagram of the interactions of various components of the computer system shown in FIG. 10. The system of FIG. 11 shares common components with the system of FIG. 2B discussed above. For simplicity, these common components have been designated with the same reference characters and will not be discussed further here. In the system of FIG. 11, error reporting client 902 collects information related to improper executions of software modules executing on the computing device 900. When the error reporting client 902 detects that a software module is improperly executing—for example, has crashed or otherwise exited improperly—the error reporting client 902 may retrieve information related to the improper execution both from the software modules and from the mitigation enablement module 114. The information related to the software modules may be any suitable information, including any error codes associated with the improper execution and a "stack dump" providing state information on the execution of the software module at the time of the crash. In addition to this information from the software modules, the error reporting client 902 may also be adapted to retrieve from the mitigation enablement module 114 information on any memory errors and, if the software module was operating in mitigation mode, any mitigation successes detected by the mitigation module 112 as well as mitigation ticket values for the software module. In so doing, the error reporting client 900 is able to retrieve more information on a state of the software module at the time of the improper execution than conventional error reporting clients, and provide more detailed information to the aggregation server than previously possible. Though error reporting has conventionally been triggered by a crash, other suitable triggers may be used, including just passage of time so that stored mitigation information may be transferred to an error reporting service even if no crashes occur.

The error reporting client 902 can then transmit this detailed information to the error reporting server 1002 for storage in the error reporting data store 1004. The information in the error reporting data store 1004 may comprise crash information 1106 on improper executions of software modules as well as mitigation settings 1108. The mitigation settings 1108 may be any suitable information about mitigations and/or any suitable information that may be used to govern mitigation modes on computing devices such as computing device 900, including success frequency information. The error reporting server 1002 may then process the information transmitted from the error reporting client 902 alongside the information stored in the error reporting data store 1104 and provide any suitable configuration information in response. As mentioned above, the configuration information may be any suitable information, including suggested initial mitigation ticket values. In addition to providing the configuration information to the error reporting clients, the error reporting server 1002 may transmit any suitable information to other parties. For example, information on successes of the mitigation actions and on types of errors may be transmitted to developers of the memory management module 110 and/or operating system 108, and information on memory errors detected by the memory management module 110 may be transmitted to developers of a software module such that the developers can attempt to identify and solve the programming bug causing the memory errors.

FIGS. 12 and 13 show exemplary processes for operating a computing system in implementations that include an error reporting server operating according to some of the principles described herein. In the examples of FIGS. 12 and 13, the information transmitted to the error reporting server and the information received from the error reporting server may include mitigation ticket values. It should be appreciated, however, that not all implementations that include error reporting servers may use statistics to track success of mitigation actions over multiple instances, and some implementations that do use statistics may not use mitigation ticket values, as embodiments of the invention are not limited in these respects.

FIG. 12 shows one exemplary process 1200 for operating a computing device 900 in accordance with some of the principles described herein to exchange information with an error reporting server 1002 and accept configuration data from the server. It should be appreciated, however, that the implementations of the principles described herein that do feature an error reporting server may operate in any suitable manner, and that these implementations are not limited to being implemented with the exemplary process 1200 shown in FIG. 12.

The exemplary process 1200 begins in block 1202, wherein the error reporting client 902 checks whether a user has authorized error reporting. If so, the error reporting client opens a connection to the error reporting server 1002 and, in block 1204, transmits information to the server to report errors and mitigation successes. The actions of blocks 1202 and 1204 may be carried out at any suitable time, including following the detection of improper execution of a software module or at a periodic reporting time. The information transmitted in block 1204 may change based on the time and circumstances under which the transmission is made. For example, if the actions are taken in response to a detection of an improper execution of a software module, then the information may comprise information on the errors and mitigation successes related to that software module, while if the actions are taken at a periodic reporting time the information may relate to all or some of the software modules executed by the computing device 900 since the last reporting. In block 1206, following the transmission of block 1204, the error reporting client 902 may request from the error reporting server 1002 configuration data and, in block 1208 receive the configuration data. In block 1210, the error reporting client 902 may provide the configuration data to the mitigation enablement module 116, which may in turn update the rules and settings data 218 of the mitigation data store 212. Upon updating the data store 212, the mitigation enablement module 114 may then apply the rules and settings to selectively enable mitigation mode for software modules executing on the computing device 900, and the process ends. Applying the rules and settings may be done in any suitable manner. For example, if the configuration data includes initial mitigation ticket values, upon enabling mitigation mode for a software module the mitigation enablement module 114 may initialize the mitigation ticket value for the software module to the values contained in the configuration data.

FIG. 13 shows an illustrative process 1300 for operating an error reporting server 1002 in accordance with some of the principles described herein. Process 1300 begins in block 1302, wherein the error reporting server 1002 opens a connection to one or more error reporting clients 900/1006A/1006B. In block 1304, the error reporting server 1002 receives information from the clients and aggregates the information in the data store 1004. The information received in block 1304 may be any suitable type(s) of information, including information on errors experienced by software modules and detected by error reporting clients, and successes of mitigation actions taken and detected by mitigation modules 112. In block 1306, the mitigation success data received in block 1304 is compared to previous mitigation success data for each of the software modules reported in the information to determine whether, overall, operating the software module in a mitigation mode is successful. For example, it may comprise determining whether the number of improper executions detected is outweighing or substantially outweighing the number of errors mitigated, or may comprise any other suitable determination.

Based on this comparison of block 1306, a determination is made in block 1308 for whether the mitigation mode is, for a particular software module, successful at mitigating memory errors. If so, then in block 1310 the error reporting server 1310 may inform clients to use mitigation mode, for example, by informing the clients to use a high initial mitigation ticket value for the software module. If, however, in block 1308 it was determined that mitigation mode is not successful, then in block 1312 the error reporting server informs clients to limit use of mitigation mode by, for example, informing the clients to use a low initial mitigation ticket value. Following the informing of clients in either of blocks 1310 or 1312 the process 1300 ends.

As discussed above, in some implementations the mitigation enablement module 114 may not enable mitigation mode for a particular software module until the software module has crashed a threshold number of times or a threshold number of times in a certain time period, such as four times in one hour. In some implementations that include an error reporting server 1002 with which a computing device 900 may interact, however, information may be transmitted to the error reporting server following each detection of improper execution by a software module, including following the first such detection. If the records of the error reporting server 1002 indicate that a mitigation mode is successful at mitigating errors of the software module, then, as discussed in connection with FIGS. 12 and 13, the error reporting server 1002 may transmit to the computing device 902 configuration information indicating that the mitigation mode should be used. In response to this configuration information, the mitigation enablement module 114 may, in these implementations, enable mitigation mode for the software module upon next execution of the software module, regardless of the threshold rules maintained by the mitigation enablement module.

Having thus described several aspects of at least one embodiment of this invention, it is to be appreciated that various alterations, modifications, and improvements will readily occur to those skilled in the art.

For example, two modes of operations are described in which all available mitigations are applied or no mitigations are applied. It should be appreciated that in some embodiments, intermediate options may be possible in which some, but not all, available mitigations are applied.

Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of operating a computing device, the method comprising:
    requesting from a data store associated with a memory management module of the computing device records associated with a software module executing on the computing device, the records comprising information on memory-related errors detected by the memory management module and information on instances of effectiveness and instances of non-effectiveness of one or more mitigation actions taken by the memory management module, when performing memory operations for the software module, to mitigate the effect of the memory-related errors of the software module; and
    transmitting the records to a remote aggregation server.

2. The method of claim 1, further comprising:
    receiving mitigation configuration information from the remote aggregation server; and
    determining based on the mitigation configuration information whether the memory management module should apply the one or more mitigation actions when performing the memory operations requested by the software module.

3. The method of claim 2, wherein the acts of requesting, transmitting, and receiving are carried out by an error reporting client of the computing device, the error reporting client being adapted to configure the memory management module based on the instructions received from the remote aggregation server.

4. The method of claim 2, wherein the mitigation configuration information received are instructions on at least one set of statistics that should be collected and evaluated by the computing device to determine whether to apply one or more mitigation actions when performing memory operations requested by the software module.

5. The method of claim 4, wherein the instructions on the at least one set of statistics is an instruction regarding a length of a time period during which the at least one set of statistics is to be collected.

6. The method of claim 1, wherein the mitigation configuration information is an initial mitigation ticket value that should be applied for the software module in determining whether to apply the one or more mitigation actions.

7. The method of claim 2, further comprising:
    adjusting settings in the data store associated with the memory management module based on the mitigation configuration information; and
    operating the memory management module in accordance with the adjusted settings.

8. The method of claim 1, further comprising:
   initiating the act of requesting in response to detecting a crash of the software module.

9. At least one computer-readable storage medium having encoded thereon computer-executable instructions that, when executed, cause a computer to perform a method of operating a memory management module of a computing device, the method comprising:
   detecting a crash of a software module executing on the computing device;
   transmitting to an aggregation server information regarding the crash, the information comprising stack information for the crash and records comprising memory-related errors caused by the software module and detected by the memory management module, the records further comprising statistics regarding success of the memory management module in mitigating the effect of the memory-related errors, over multiple instances of the software module, when performing memory operations for the software module;
   receiving, from an aggregation server, instructions regarding how the memory management module should operate to mitigate the effects of at least the memory-related errors detected by the memory management module; and
   upon detecting a request from the software module for the memory management module to perform a memory operation,
      determining, in accordance with the instructions from the aggregation server, whether to apply one or more mitigation actions when performing the memory operation and
      performing the memory operation with or without the one or more mitigation actions based on the determining.

10. The at least one computer-readable storage medium of claim 9, further comprising adjusting settings in a data store associated with the memory management module based on the instructions; and
   wherein operating the memory management module in accordance with the instructions comprises operating the memory management module in accordance with the adjusted settings.

11. The at least one computer-readable storage medium of claim 9, wherein the instructions regarding how the memory management module should operate comprise instructions on at least one set of statistics that should be collected and evaluated by the computing device to determine whether to apply the one or more mitigation actions when performing memory operations requested by the software module.

12. The at least one computer-readable storage medium of claim 11, wherein the instructions regarding the at least one set of statistics is an initial mitigation ticket value that should be applied for the software module in determining whether to apply the one or more mitigation actions.

13. The at least one computer-readable storage medium of claim 9, wherein the instructions regarding how the memory management module should operate comprise an instruction to enable the one or more mitigation actions for the software module.

14. The at least one computer-readable storage medium of claim 13, wherein detecting the crash comprises detecting multiple crashes of the software module prior to the act of transmitting.

15. A method of operating an error reporting server, the method comprising:
   receiving error reporting information from at least one client, the error reporting information comprising error information regarding a software module and mitigation success information regarding a rate of effectiveness of at least one mitigation action taken by the at least one client when performing memory operations for the software module in preventing an error of the software module from negatively affecting the at least one client;
   aggregating the error reporting information from the at least one client and information previously stored on the error reporting server;
   evaluating aggregated information from the act of aggregating to determine whether it is more likely than not that the software module will execute properly if a memory management module of a computing device executing the software module performs the at least one mitigation action when performing memory operations for the software module; and
   transmitting mitigation configuration information to the at least one client based on the act of evaluating.

16. The method of claim 15, wherein the mitigation configuration information comprises an instruction to enable the at least one mitigation action for the software module.

17. The method of claim 15, wherein the mitigation configuration information comprises at least one instruction on at least one set of statistics that should be collected and evaluated by the at least one client to determine whether to apply the at least one mitigation action when performing memory operations requested by the software module.

18. The method of claim 17, wherein the at least one instruction regarding the at least one set of statistics is an initial mitigation ticket value that should be applied for the software module in determining whether to apply the at least one mitigation action.

19. The method of claim 15, further comprising:
   transmitting the error reporting information, including the mitigation success information, for the software module to a software vendor responsible for developing an operating system of the at least one client.

20. The method of claim 15, further comprising;
   transmitting the error reporting information, including the mitigation success information, for the software module to a software vendor responsible for developing the software module.

\* \* \* \* \*